Aug. 13, 1963

W. F. WOLFE 3,100,470

CAN BODY MAKING MACHINE

Filed Aug. 30, 1957

INVENTOR.
WAYNE F. WOLFE
BY
Mullin and Hanscom
ATTORNEYS

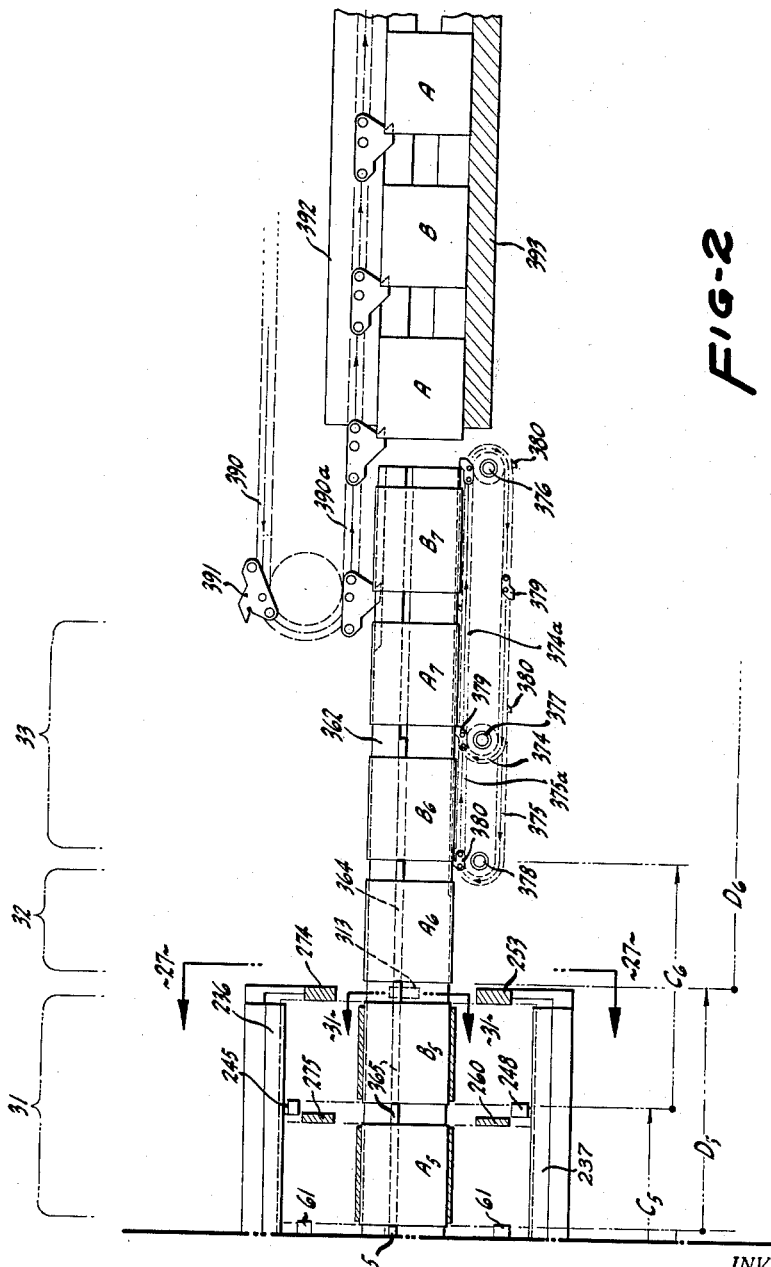

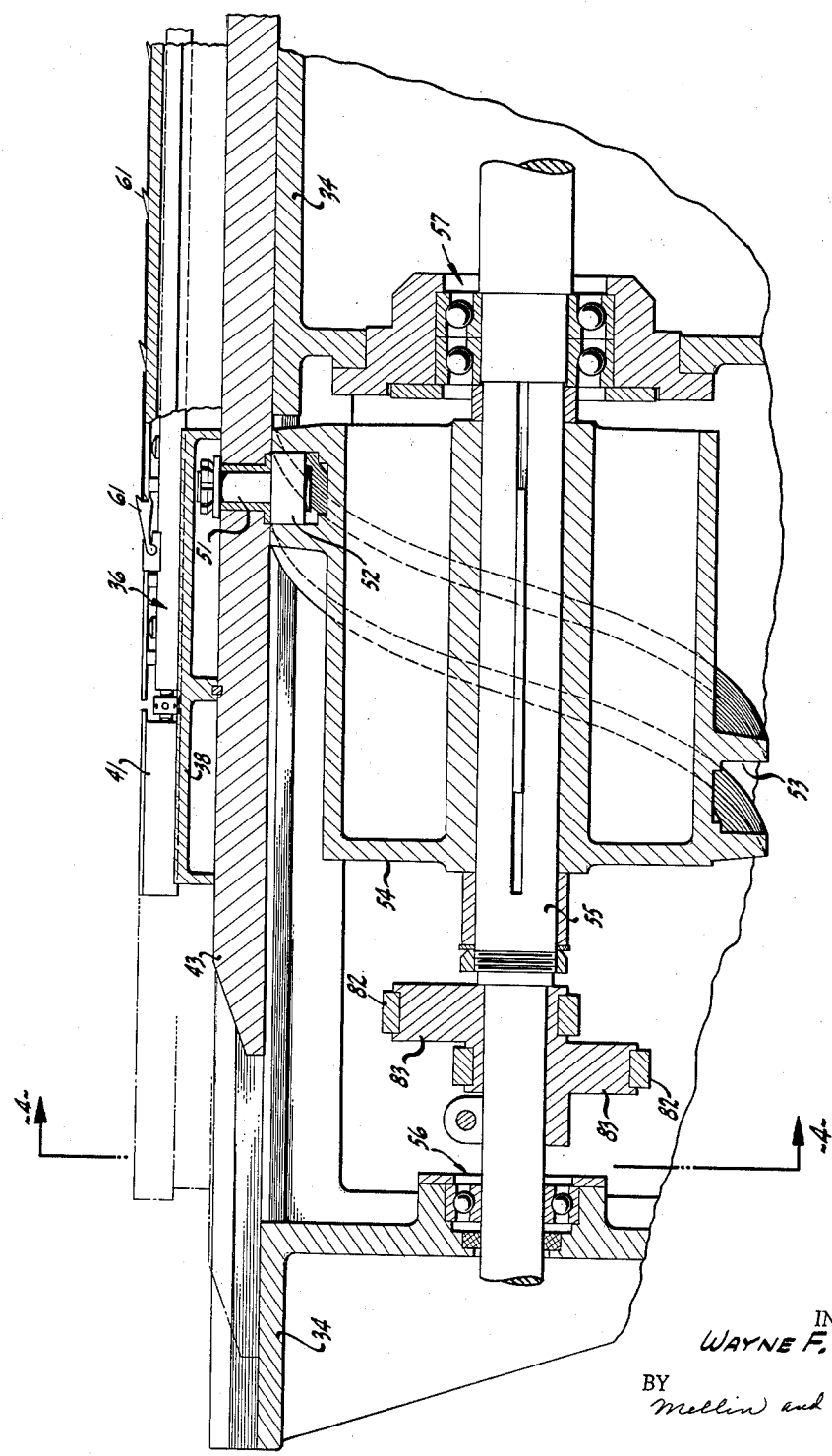

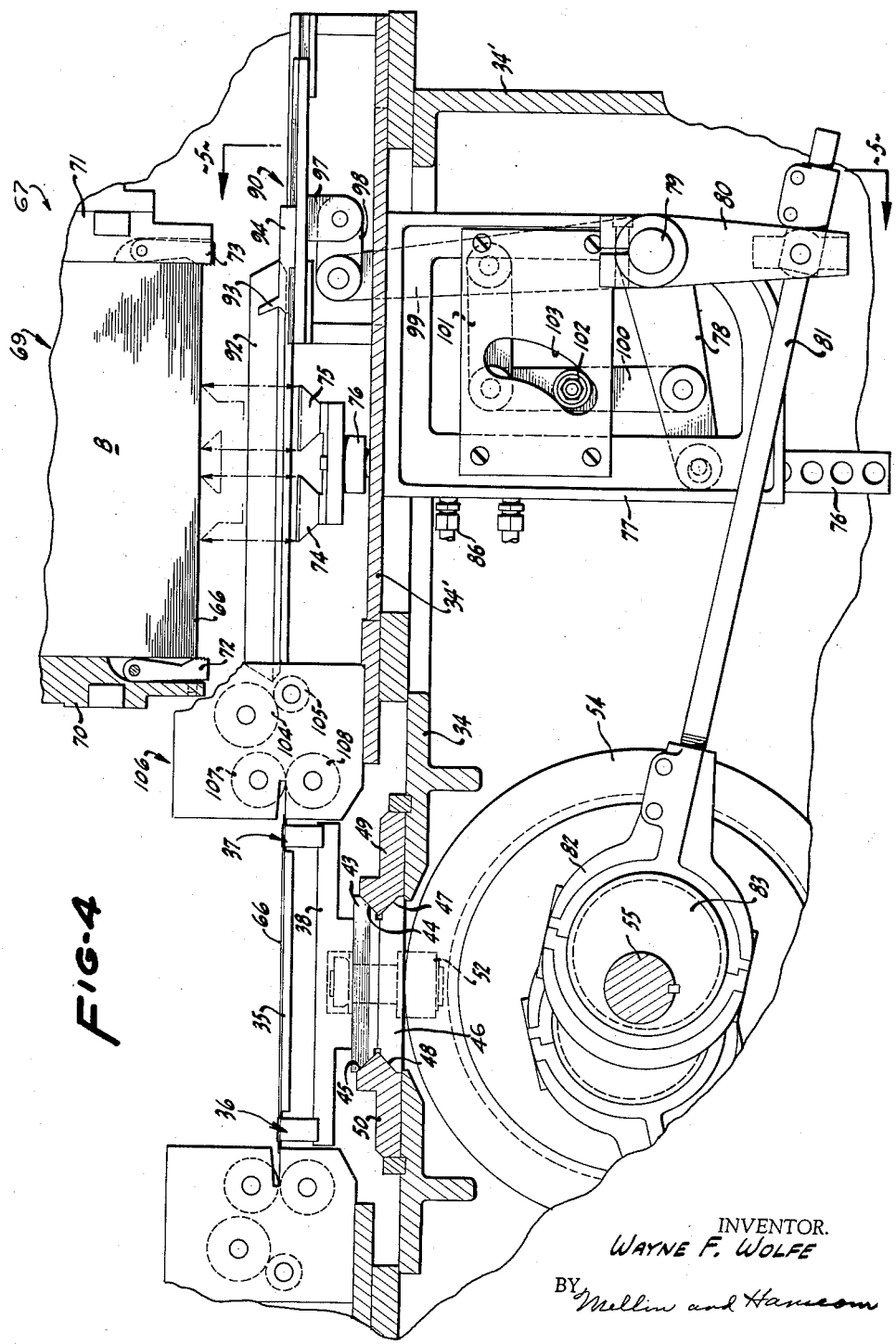

Aug. 13, 1963
W. F. WOLFE
3,100,470
CAN BODY MAKING MACHINE
Filed Aug. 30, 1957
17 Sheets-Sheet 5
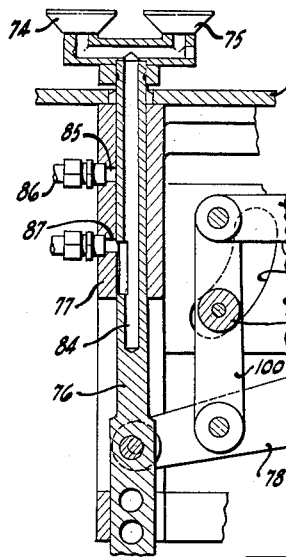
FIG·6
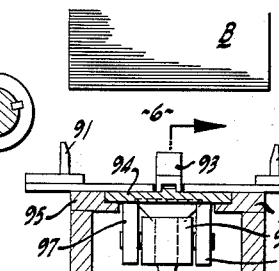
FIG·5
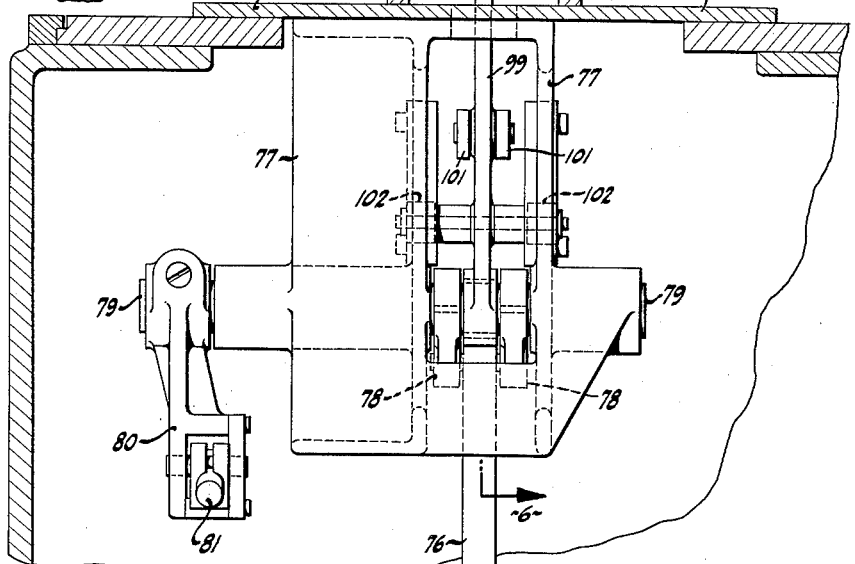
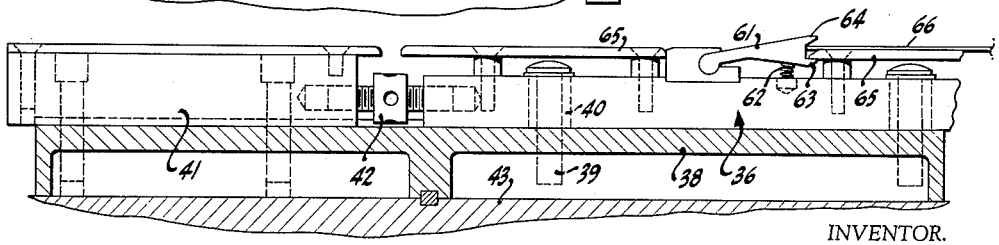
FIG·7
INVENTOR.
WAYNE F. WOLFE
BY Mellin and Hanscom
ATTORNEYS

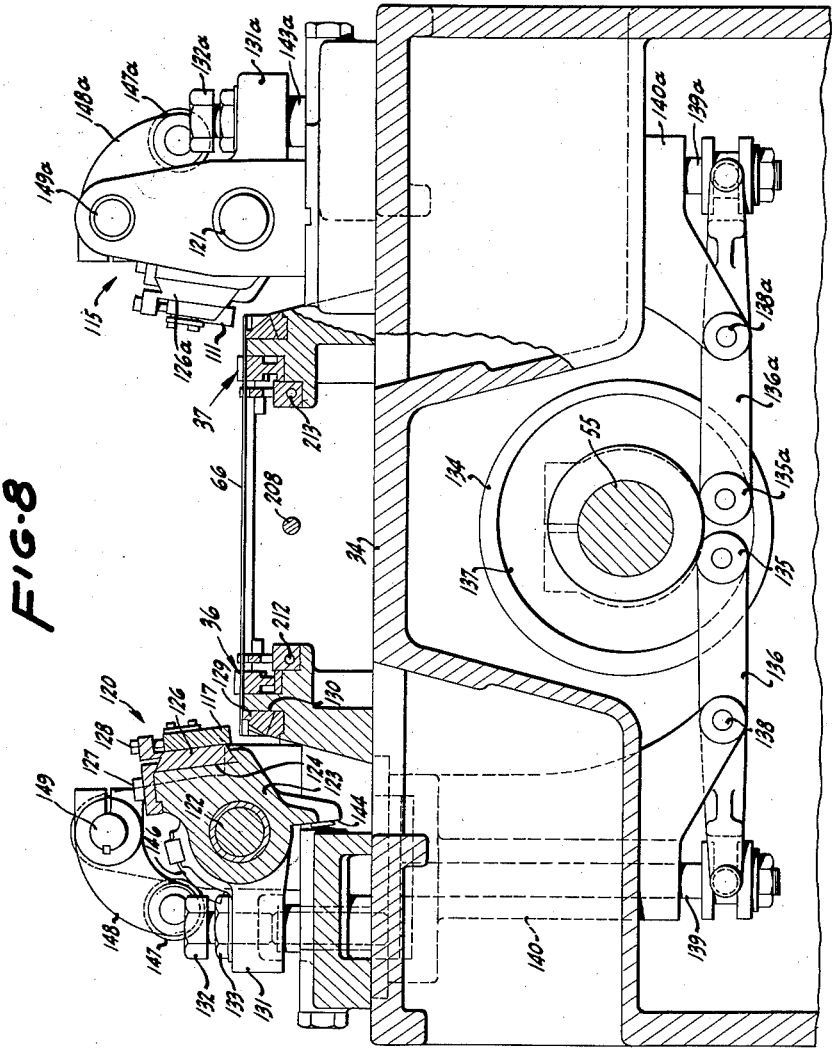

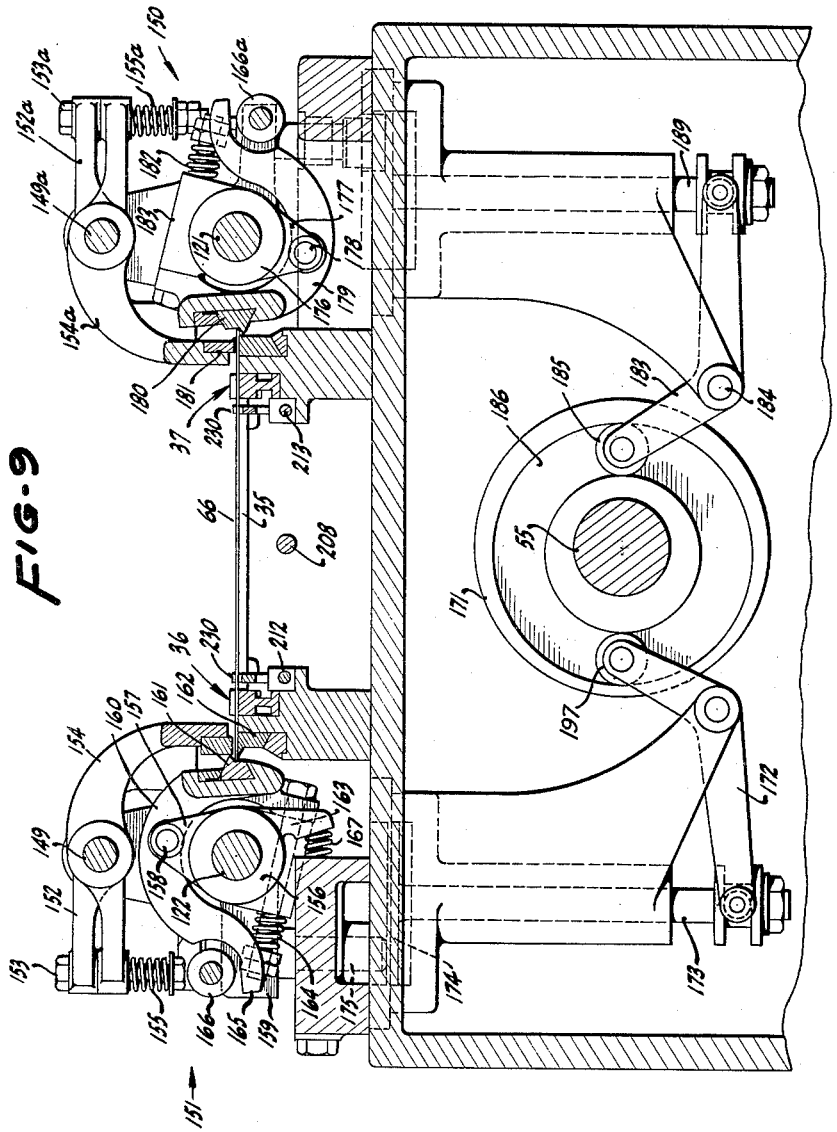

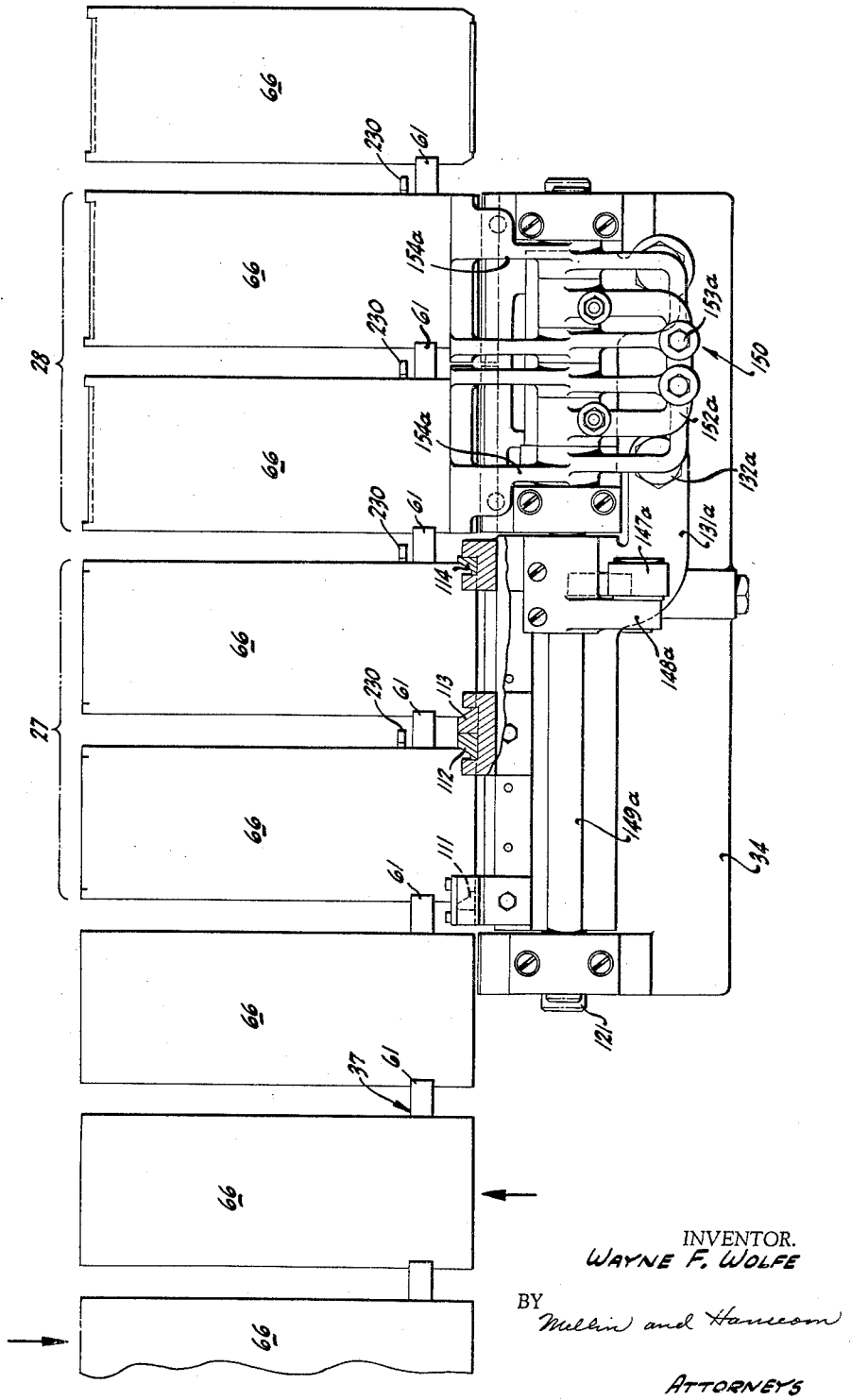

Aug. 13, 1963 W. F. WOLFE 3,100,470
CAN BODY MAKING MACHINE
Filed Aug. 30, 1957 17 Sheets-Sheet 9

INVENTOR.
WAYNE F. WOLFE
BY
Mellin and Hanscom
ATTORNEYS

INVENTOR.
WAYNE F. WOLFE
BY Mellin and Hanscom
ATTORNEYS

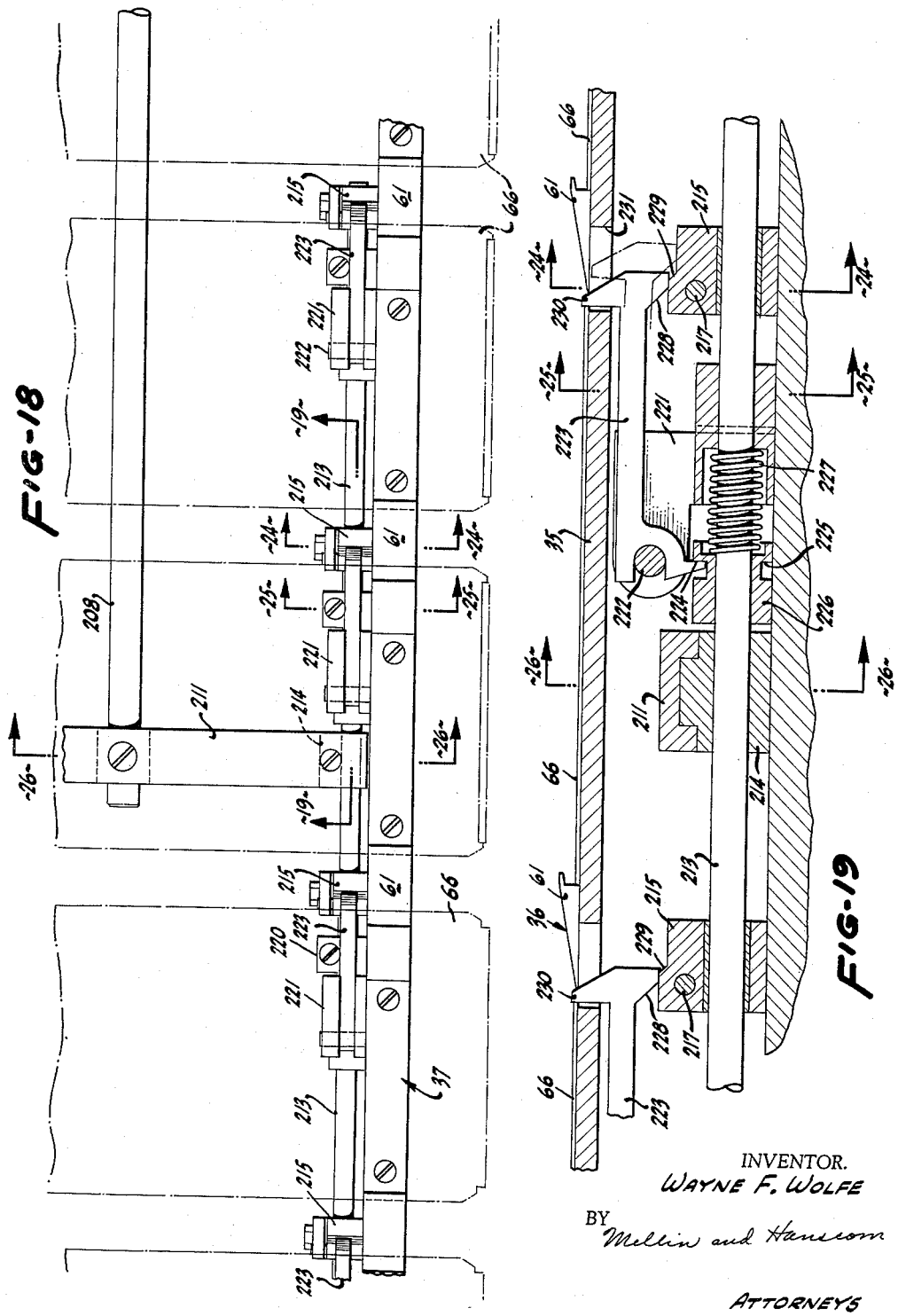

Aug. 13, 1963  W. F. WOLFE  3,100,470
CAN BODY MAKING MACHINE
Filed Aug. 30, 1957  17 Sheets-Sheet 13
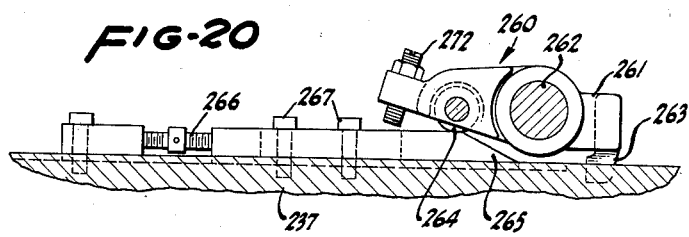
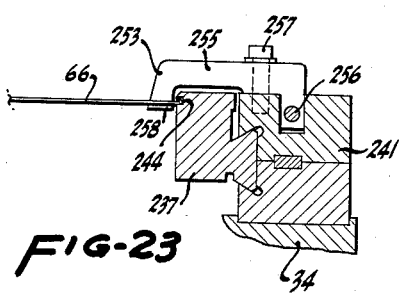
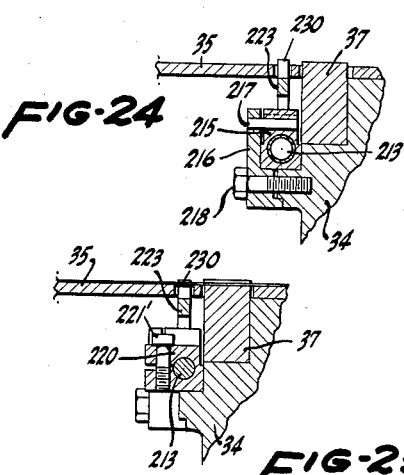
INVENTOR.
WAYNE F. WOLFE
BY
ATTORNEYS

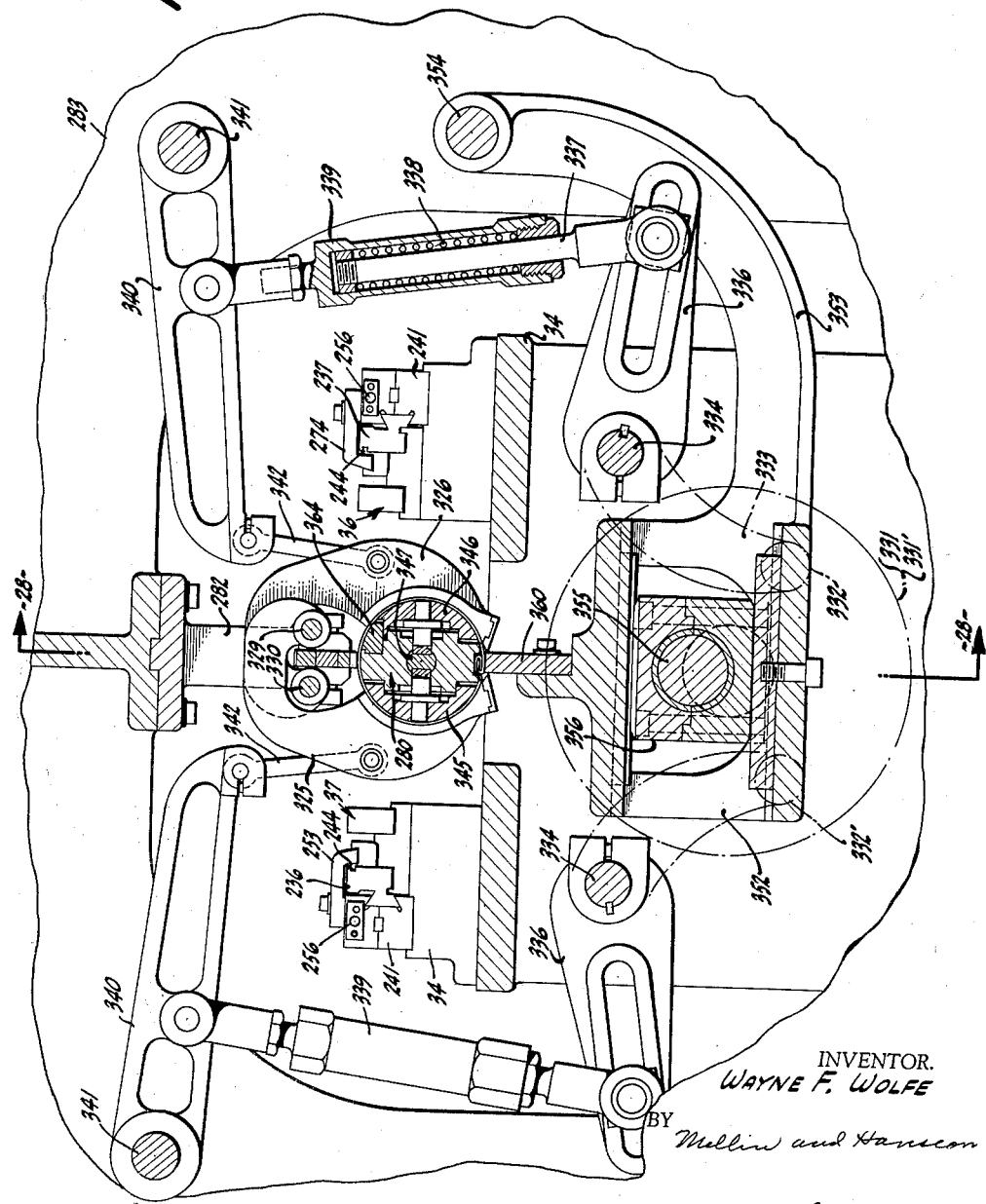

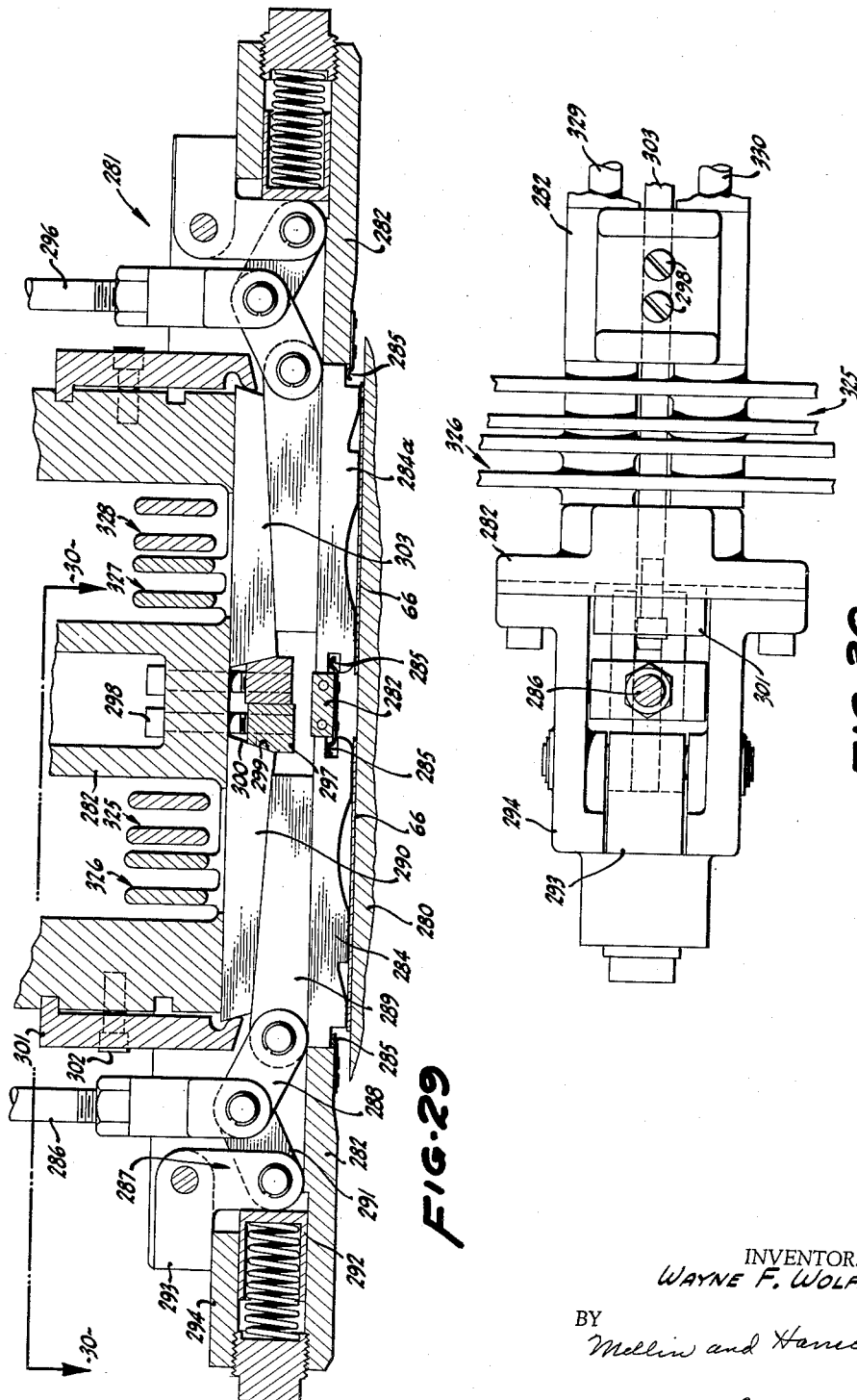

United States Patent Office 3,100,470
Patented Aug. 13, 1963

3,100,470
CAN BODY MAKING MACHINE
Wayne F. Wolfe, Castro Valley, Calif., assignor to United Can and Glass Company, Hayward, Calif., a corporation of Delaware
Filed Aug. 30, 1957, Ser. No. 681,227
8 Claims. (Cl. 113—11)

This invention relates to machines for automatically forming cylindrical can bodies from flat can blanks.

In the making of can bodies, several operations are required, such as pre-flexing the can body blanks, notching and slitting the corners of the blanks, folding the side edges of the blanks into oppositely formed hooks, forming the notched and folded blanks into cylindrical can bodies with the oppositely formed hooks in interengagement, and clenching the interengaged side edges. Each one of these operations requires a finite length of time to perform, which, in turn, limits the capacity of a machine in the number of can bodies that may be formed in a given length of time. One solution has been found to provide a can body making machine in which a steady stream of can blanks is fed through the machine and in which separate stations are provided to simultaneously perform each of the above mentioned forming operations. The can blanks are thus moved in unison from one station to another and rest in any given station for the time required to perform the forming operation. The capacity of such an arrangement is accordingly limited by the time duration of the longest single forming operation. However, as it is attempted to increase the capacity of such a machine, it becomes more and more difficult to synchronize the operation of each forming station with one another and with the advancing mechanism so that the minimum time may be spent in the operating stations, and in the advancing of the can blanks from one station to the next. In the present invention, applicant has provided a positively acting mechanism for synchronizing the operation of the various forming stations to one another and to the advancing of the can blanks from one forming station to the next.

A further problem in increasing the production of can bodies is the factor of floor space required by such machines in the can body making plant. In most such factories, the amount of floor space is limited and the problem is how to increase the production capacity of a given amount of floor space. The solution to increased production is not simply to use two independent machines operating in tandem, for although twice as many can bodies would be produced, the machines would occupy twice as much room, which does not increase the capacity per given floor space. Furthermore, such an arrangement would require twice as many parts as a single machine. In addition, such an arrangement would further require a complicated mechanism for taking the separate outputs of each machine and combining them into a single stream of can bodies for further manipulation.

Applicant has devised a can body making machine in which the can body production is increased proportionately more than an increase in the physical size of the machine, in order to increase the productive capacity of the machine per given floor area. Applicant has accomplished this by devising a machine in which a steady stream of can blanks passes through the machine and in which the various forming operations are performed on a plurality of can blanks at each station. The present machine provides the necessary mechanisms to enable the machine to operate on more than a single blank, as will be described in the following detailed description.

It is a principal object of the present invention to provide a can body making machine with means for notching, folding and forming can bodies wherein these operations are performed simultaneously on two can blanks, and wherein the can blanks are fed between operating stations by a feed mechanism moving the blanks two positions between each of the operations.

A further object of the invention is to provide a can body making machine having notching, folding and forming stations, and a feed mechanism for feeding can blanks from one station to another, with a positively operating mechanism for synchronizing operating means with one another and with the feeding means.

A further object of the invention is to provide a machine capable of forming two can bodies simultaneously and intermittently with means for removing the formed can bodies in a steady flow from the machine.

Other objects and advantages will become apparent in the course of the following detailed description.

In the accompanying drawings, forming a part of this application, and in which like numerals are employed to designate like parts throughout the same, FIGS. 1 and 2 together form a schematic view of a machine embodying the principles of the invention, the section being taken immediately above the work surface of the machine.

FIG. 3 is a longitudinal cross-sectional view in elevation of the feed bar drive, taken on line 3—3 of FIG. 1.

FIG. 4 is a transverse cross-sectional view in elevation of the can blank feeder, taken along line 4—4 of FIGS. 1 and 3.

FIG. 5 is a longitudinal cross-sectional view in elevation taken along line 5—5 of FIG. 4.

FIG. 6 is a transverse cross-sectional view in elevation taken on line 6—6 of FIG. 5.

FIG. 7 is an enlarged detail of a portion of FIG. 3.

FIG. 8 is a transverse cross-sectional view in elevation of the notching station, taken along line 8—8 of FIG. 1.

FIG. 9 is a transverse cross-sectional view in elevation of the folding station, taken along line 9—9 of FIG. 1.

FIG. 10 is a partial plan view of the machine, illustrating the notching and folding stations.

FIG. 18 is a partial plan view of the machine, illustrating the registration mechanism.

FIG. 19 is a longitudinal cross-sectional view taken along line 19—19 of FIG. 18.

FIG. 20 is a longitudinal cross-sectional detail taken on line 20—20 of FIG. 14.

FIG. 21 is a transverse cross-sectional detail taken along line 21—21 of FIG. 14.

FIG. 22 is a longitudinal elevational detail taken on line 22—22 of FIG. 21.

FIG. 23 is a transverse cross-sectional detail taken along line 23—23 of FIG. 14.

FIG. 24 is a transverse cross-sectional detail taken on line 24—24 of FIGS. 18 and 19.

FIG. 25 is a transverse cross-sectional detail taken on line 25—25 of FIGS. 18 and 19.

FIG. 26 is a transverse cross-sectional detail taken on line 26—26 of FIGS. 18 and 19.

FIG. 27 is a transverse cross-sectional view in elevation of the forming station, taken along line 27—27 of FIG. 2.

FIG. 29 is an enlarged longitudinal cross-sectional view of a portion of FIG. 28.

FIG. 30 is a plan view, partly in section, taken along line 30—30 of FIG. 29.

Figure 1:
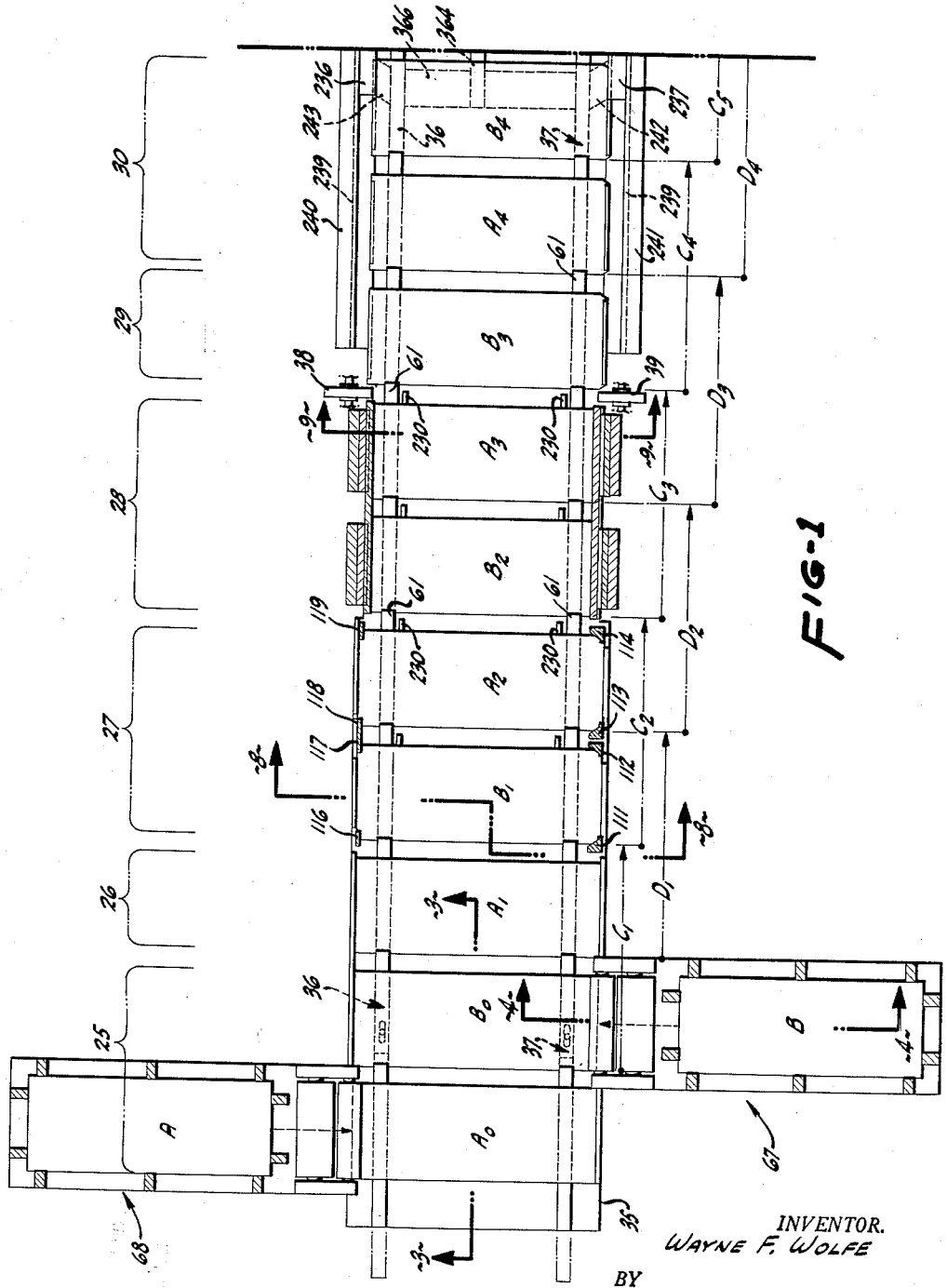

Referring now to the drawings, and particularly to FIGS. 1 and 2 thereof, the machine in general comprises a can blank loading station 25, an idle station 26, a notching and slitting station 27, a folding station 28, a fluxing station 29, an idle station 30, a forming station 31, an idle station 32, and a can pick-up station 33. The machine frame 34 has a flat upper work surface 35 extending from the loading station 25 at the rear of the machine to the forward end of the fluxing station 29. Two transversely spaced feed bars 36 and 37 are slidably supported for longitudinal reciprocation in suitable grooves formed in the upper surface 35, and operate to feed can blanks forwardly along the machine on the first half cycle of their reciprocatory movement.

In general, the machine operates to feed can blanks from the can blank stacks A and B simultaneously onto the machine surface 35 at positions $A_0$ and $B_0$, respectively. On each cycle of feed bar reciprocation, the blanks will be advanced by the feed bars 36 and 37 along the machine surface 35 to the various stations. The first half of the first cycle of reciprocation of the feed bars 36 and 37 will move the blank at $A_0$ a distance $C_1$ to position $A_1$ and will move the blank at $B_0$ a distance $D_1$ to position $B_1$. On the second half of the first cycle of reciprocation, the can blank at $B_1$ will be notched. On the first half of the second cycle of feed bar reciprocation, the can blanks at $A_1$ and $B_1$ will be moved distances of $C_2$ and $D_2$ to positions $A_2$ and $B_2$, respectively. On the second half of the second cycle of feed bar reciprocation, the can blank at $A_2$ will be notched, and the can blank at $B_2$ will have its ends folded to form opposed hooks.

On the first half of the third cycle of feed bar reciprocation, the blanks will be moved distances of $C_3$ and $D_3$ to positions $A_3$ and $B_3$, respectively. In so moving, the side edges of can blank B will be wiped with flux by conventional fluxing wheels 38 and 39, rotating through flux baths (not shown). On the second half of the third cycle of feed bar reciprocation, the can blank at $A_3$ will have its side edges folded into opposed hooks, while the can blank at $B_3$ will rest at the fluxing station 29.

On the fourth cycle of feed bar reciprocation, the can blanks at $A_3$ and $B_3$ will again be moved distances $C_4$ and $D_4$ to the idle position $A_4$ and $B_4$, respectively, with the can blank A having its edges wiped with flux as it passes the fluxing wheels 38 and 39.

On the first half of the fifth cycle of feed bar reciprocation, the can blanks will be moved from $A_4$ and $B_4$ to positions $A_5$ and $B_5$, respectively, in the forming station 31. On the second half of this cycle, the two can blanks will be formed into cylindrical open ended cans, with the oppositely formed hooks on their edges coming together and being interlocked.

On the next cycle of feed bar reciprocation, the formed can bodies will be advanced to positions $A_6$ and $B_6$, respectively, where they are removed from the machine by conveyor belts in a manner to be hereinafter described.

Although the preceding steps of operation describe the advance of only a single pair of can blanks through the machine, it is to be understood that a new pair of can blanks is fed to the machine on each cycle of feed bar reciprocation and that there will thus be individual can blanks at each of the above mentioned positions at any one time during operation of the machine.

Turning now to the specific operation of the machine, and referring to FIGS. 3, 4 and 7, the feed bar 36 is longitudinally adjustably connected to a reciprocating plate 38 by a lock stud 39 extending through a longitudinally elongated slot 40 in the feed bar 36. A block member 41 is rigidly secured to the rear end of plate 38 and an adjusting stud 42 is threadedly received in the feed bar 36 and block member 41. By turning the adjusting stud 42, the feed bar 36 may be moved to an adjusted position relative to plate 38, and the two may then be clamped in their adjusted relation by means of the locking stud 39. The feed bar 37 is similarly attached to plate 38, so that the feed bars 36 and 37 are independently adjustable relative to plate 38.

A slide member 43 is fastened to the underside of plate member 38, and is provided with downwardly and inwardly beveled side edges 44 and 45, and with upwardly and inwardly beveled side edges 47 and 48, so that the side edges of the slide member 43 form V-shaped indentations slidably receiving V-shaped guides 49 and 50 fixed on frame 34 of the machine.

A stud 51 is fixed to the slide members 43 and 46 and carries a cam follower roller 52 projecting into a helical cam slot 53 formed in the surface of barrel cam 54 mounted on camshaft 55.

Camshaft 55 is the source of drive for all of the synchronously operating mechanisms of the machine, and extends longitudinally of the machine, being supported at suitable intervals by bearings, such as shown as 56 and 57. The camshaft may be driven by any conventional drive means, such as an electric motor or the like.

The upper surface of the feed bar 36 is provided with a plurality of longitudinally spaced, upwardly spring biased fingers 61, pivotally mounted at their rear ends to the feed bars and biased upwardly by light compression springs 62. Each finger has a lower lip 63 adapted to engage plate 65 fixed to the upper surface of feed bar 36 to limit upward movement of finger 61, and an upper lip 64 adapted to engage the upper beveled surface of plate 65 so that the finger 61 may pivot downwardly flush with the plate 65 to enable the fingers to restract under cam blanks 66 supported on the upper surface 35 of the machine during movement of the feed bar 36 to the left, or rear of the machine. When the feed bar retracts sufficiently so that the finger 61 comes out from under a can blank 66, spring 62 will force finger 61 to its upper position so that it will engage the next can blank 66 to impel it forwardly as the feed bar 36 moves to the right on its next cycle of reciprocation.

The can blank feeding mechanisms of station 25 comprise two identical cross feeding mechanisms 67 and 68, one on each side of the machine, as illustrated in FIG. 1. As each feed mechanism is identical, except for the fact that they feed in opposite directions onto the upper surface 35 of the machine, only the mechanism 67 illustrated in FIGS. 4, 5 and 6 will be described.

A frame extension 34', attached to or formed integrally with frame 34, supports a can blank magazine, generally indicated at 69, comprising upwardly extending side members 70 and 71, one at each end of the can body blanks 66, designated as blanks B. Two serrated fingers 72 and 73 are pivotally mounted on the magazine side walls 70 and 71 to permit the can blanks to be fed from the magazine one by one in a conventional manner.

The picking mechanism for the one by one removal of the can blanks from the magazine 69 comprises a pair of upwardly extending suction cups 74 and 75 mounted on a reciprocating cross-head 76 guided in a suitable guide member 77 fixed to frame 34'. The lower end of crosshead 76 is reciprocated by crank 78 keyed to stub shaft 79 rotatably mounted on frame 34'. Also keyed to stub shaft 79 is another crank arm 80, the crank arm 80 being oscillated by shaft 81 pivotally secured at the lower end of crank arm 80 and extending to sleeve 82 encompassing cam 83 fixedly mounted on camshaft 55. As is obvious, each time camshaft 55 rotates, shaft 81 will reciprocate longitudinally to oscillate crank arm 80 and crank arm 78 to, in turn, move the crosshead 76 through a longitudinally reciprocatory movement.

Crosshead 76 has an internal passage 84 therein communicating with suction cups 74 and 75 and adapted to register with passage 85 formed in guide member 77, the latter passage being connected by hose 86 to a conventional source of vacuum (not shown), when the crosshead is in its uppermost position, so that a can blank 66 will be held by the suction cups 74 and 75 as the crosshead moves downwardly. Passage 87 communicating with atmosphere in guide member 77 allows the vacuum to be broken when the crosshead retracts downwardly, to release the gripped can blank for lateral movement by the cross feed mechanism indicated generally at 90.

The can blanks 66, when released, rest in guide members 91 and 92, extending transversely of the machine, and spaced laterally from each other to allow the pusher head 93 of pusher 94 to slide longitudinally therebetween and force the can blank towards the center of the machine.

Pusher member 94 is mounted for sliding movement in flanged members 95 and 96, fixed to frame 34', and carries a depending flange 97 having link 98 pivotally connected thereto. The other end of link 98 is pivotally connected to arm 99 which extends downwardly to and is freely mounted on stub shaft 79.

Link 100 is pivotally attached at its lower end to crank 78, and at its upper end to link 101, the latter being also pivotally connected to arm 99. Link 100 carries a cam follower roller 102 thereon projecting into a cam slot 103 in cam plate 104 fixed to frame member 34'. As crank 78 moves in a clockwise direction, the upper end of link 100 moves rightwardly under the influence of the cam follower 102 in cam slot 103 to move arm 99, link 98 and pusher to the right. At the same time, the suction cups move upwardly to pick off the lowest can blank 66 from the magazine. As the can blank moves downwardly by the rotation of crank arm 78 in a counterclockwise direction, the pusher 94 will start to travel to the left. The can blank is deposited on the guides 91 and 92 and the pusher head 93 engages the can blank, moving it sufficiently towards the center of the machine so that the can blank enters the power driven rolls 104 and 105 of conventional can body blank conditioner 106. This latter mechanism performs the usual function of flexing the blank first in one direction and then in the other direction so as to make the blank more malleable and easier to form into a cylinder when it reaches cam forming station 31 of the machine. The rolls 104, 105, 107 and 108 of the can body conditioner 106 are continuously driven at any desired rate by conventional means (not shown) and eject the can blank out onto the upper surface 35 of the machine, the forward motion of such blanks being arrested by suitable stop members.

The combined operation of the feeding mechanisms 67 and 68 both operate at the same time and cooperate with each other to feed a pair of can blanks onto the surface 35 of the machine such that the side edges of the can blanks are aligned in a line parallel to the longitudinal axis of the machine, and such that the rearward edge of the can blank in the $B_0$ position is spaced from and parallel to the forward edge of the can blank in the $A_0$ position.

The feed bars are adjusted with respect to the can blank feeding mechanism so that the feed bars are in their leftward position (shown in dotted lines in FIG. 3) when the can blanks 66 are fed thereto, and with the fingers 61 in their upward position to engage the can blanks as the feed bars move rightwardly to the full line position of FIG. 3. As has been stated, each forward movement of the feed bars will be equal to the height of two blanks plus twice the spacing between adjacent blanks, as indicated by the arrows $C_1$, $C_2$, $C_3$, etc., and $D_1$, $D_2$, $D_3$, etc. of FIG. 1.

Referring now to FIGS. 1, 8, 10 and 13, notching and slitting mechanisms are provided at the notching station 27, having notching punches 111, 112, 113 and 114 adjacent the right side of the machine and notching punches 116, 117, 118 and 119 adjacent the left side of the machine. The punches 111 to 114, inclusive, are fixed to a rocking mechanism 115 pivotally mounted on shaft 121, the latter being journaled for rotation on frame 34 and extending parallel to the longitudinal axis thereof. Similarly, punches 116 to 119, inclusive, are fixed to a rocking mechanism 120 pivotally mounted on shaft 122 journaled on and extending parallel to the longitudinal axis of frame 34.

The rocking mechanism 120 comprises a sleeve member 123 loosely mounted on shaft 122 and having a dovetail groove 124 to receive a dovetail bar 126, the latter having vertical grooves to receive the notching punches, such as 117. Cap screws 127 and 128 enable the notching punches to be adjusted longitudinally and vertically of the machine. Die blocks 129 are provided in suitable recesses 130 in frame 34 to cooperate with each of the notching punches.

Sleeve member 123 is provided with a flange 131 carrying screw 132 extending therethrough, the screw 132 being vertically adjustable in flange 131 to enable the notching stroke of the rocking mechanism to be varied, as desired, the screw 132 being locked into the desired position by locking nut 133.

A face cam 134 secured to the main camshaft 55 is utilized to provide the drive for the rocking mechanism 120 in the following manner: A cam follower roller 135, mounted on one end of lever 136, rides in the cam track 137 of face cam 134 and oscillates lever 136 about the fulcrum 138 fixed to frame 34, and to cause piston 139 to vertically reciprocate in sleeve 140 fixed to frame 34. The upper end of piston 139 has a head 141 extending transversely of the machine. Carriage 142 mounted on frame 34 so as to be transversely adjustable relative thereto, carries shaft 143, extending therethrough in alignment with screw 132 and in contact with piston head 141, to enable the reciprocatory movement of piston 139 to be transmitted to the rocking mechanism 120 while yet permitting the rocking mechanism to be transversely adjusted relative to frame 34.

Carriage 142 also carries a compression spring 144 to bias sleeve member 123 to a counterclockwise direction.

Sleeve member 123 carries a cam member 146 affixed thereto and in engagement with cam follower roller 147 carried on crank arm 148 keyed to shaft 149, so that as the rocking member 120 rotates in a clockwise direction, cam 146 will cause shaft 149 to rotate in a clockwise direction to operate the can blank holding means at the folding station 28 in a manner to be described.

The right-hand rocking mechanism 115 is identical to rocking mechanism 120, and the similar parts thereof have been identified by similar reference numbers, with the subscript "$a$" appended thereto. As will be noted from FIG. 8, the two cam follower rollers 135 and 135$a$ are spaced relatively closely together in cam track 137, and as the face cam 134 rotates, the rocking mechanisms will both rotate relatively in unison, with the punches carried thereby, shearing off the desired portion of the cam blanks 66.

FIG. 9 illustrates the folding mechanisms 150 and 151 at the folding station 28, by which the notched ends of the can blanks 66 are oppositely folded into opposed hooks.

At the upper portion of the left-hand folding mechanism 151 is the forward extension of shaft 149, which was caused to rotate in a clockwise direction by the rocking mechanism 120 at the notching station 27 previously described. Crank arm 152, fixed to shaft 149, carries at its outer end bolt 153 passing therethrough. Clamp arm 154, freely mounted on shaft 149 has one end thereof encircling bolt 153 and biased upwardly thereon by spring 155, so that as crank arm 152 is rotated, spring 155 forces the clamp bar downwardly into contact with can blank 66 to hold the can blank during the folding operation. In a similar manner, clamp bar 154a on the right-hand folding mechanism 150 securely holds the right side of can blank 66.

The left-hand folding mechanism 151 further includes a sleeve member 156 freely mounted on shaft 122 and having upwardly extending ears 157 carrying a shaft 158. Sleeve member 156 also has an outward extension 159, enabling the sleeve member 156 to be rotated in the same manner as is the rocking mechanism of the notching station previously described.

A folding arm 160 in the shape of an S-curve is pivotally mounted intermediate its ends on shaft 158, and carries on its right end a die member 161 adapted to cooperate with an anvil member 162 mounted on the frame 34 of the machine. The lower end of the folding arm 160 is held against a lower projection 163 of sleeve 156 by spring 164. As sleeve 156 rotates, the shaft 158 will be carried thereby, causing the die member 161 on folding arm 160 to move downwardly, thus folding the side of can blank 66 downwardly in a roughly 90° angle. Continued rotation of sleeve 156 causes the left end 165 of the folding arm 160 to engage roller 166. Continued rotation of sleeve 122 thus forces the die member to move under and inwardly of anvil member 162 to finish the folding of the can blank side edge into a hook.

Spring 167 forces the sleeve 156 to return to its original position after the folding operation.

As has been explained, the folding mechanism 151 is driven in a manner similar to that of the notching mechanism, that is, a face cam 171, fixed to the main camshaft 55, drives lever arm 172, pivoted on frame 34, to reciprocate piston 173, piston head 174 and shaft 175, in a manner as has been explained.

The right-hand folding mechanism 150 is largely identical to the left-hand folding mechanism 151, except that it is desired to form a hook in the can blank 66 extending upwardly and inwardly. In this mechanism, the sleeve 176 mounted on shaft 121 has downwardly extending ears 177 carrying shaft 178 on which is mounted the S-shaped folding arm 179. The folding arm 179 is also provided with a die member 180 adapted to cooperate with anvil member 181 carried by the clamp bar 154a. Spring 182 holds the folding arm 179 against an upper projection 183 of sleeve 176.

As sleeve 176 rotates in a clockwise direction, die member 180 on folding arm 179 will cause the side edge of can body blank 66 to be bent upwardly around anvil 181, and the right end of the folding arm 179 will come into engagement with roller 166a. Continued clockwise rotation of sleeve 176 will then force die member 180 upwardly and inwardly against the anvil 181 to finish the formation of an upwardly and inwardly extending hook on the side edge of can body blank 66.

Figure 12:
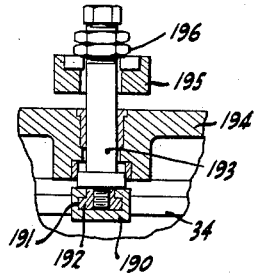
FIG. 12 is a longitudinal cross-sectional detail of FIG. 11, taken on the line 12—12 of FIG. 11.
Figure 11:
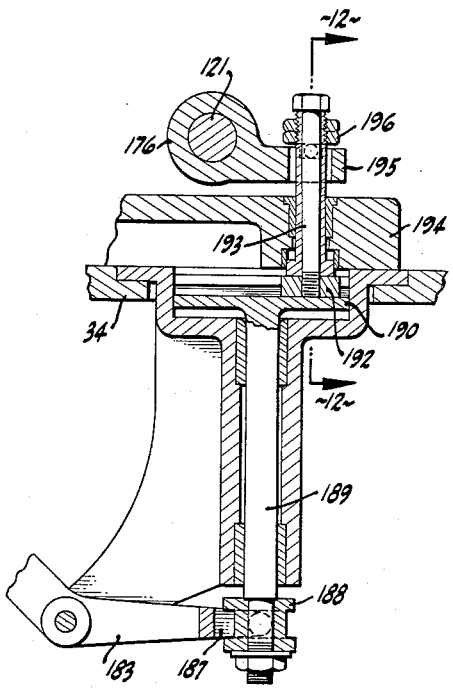
FIG. 11 is a transverse cross-sectional detail of a portion of the folding actuation.
Figure 13:
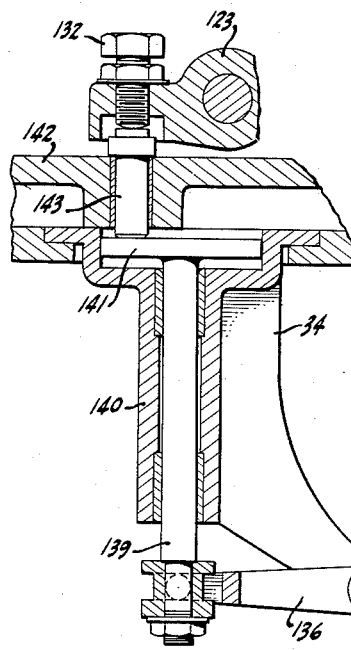
FIG. 13 is a transverse cross-sectional detail of a portion of the notching actuators.

The operative connection between sleeve 176 and face cam 171 differs somewhat from that previously described, and is best illustrated in FIGS. 9, 11 and 12. Lever 183, pivotally mounted at 184 to frame 34, has a cam follower roller 185 at one end thereof in cam track 186 of face cam 171, and a yoke 187 at the other end thereof in sliding engagement with collar 188 mounted at the lower end of piston 189.

The head 190 of piston 189 has an inverted T-groove 191 extending transversely of the machine, receiving therein a complementary T-collar 192 mounted on the lower end of shaft 193, the shaft extending upwardly slidably through carriage 194 adjustably fixed to frame 34, and passing through an extension 195 of sleeve member 176 of the folding mechanism. Jam nuts 196 enable the amount of downward stroke on extension 195 to be adjusted.

Referring now to FIG. 9, it will be noted that the cam follower 197 on lever arm 172, and the cam follower roller 185 on lever 183, are 180° apart in relation to the cam track 186 of face cam 171, and, as cam 171 rotates from the position shown, lever 172 will pivot in a clockwise direction to force piston 173 upwardly to rotate sleeve member 156 in a clockwise direction, and lever 183 will also be pivoted in a clockwise direction to force the piston downwardly to rotate sleeve member 176 also in a clockwise direction.

As may be appreciated, it is necessary that the can blanks 66 be very accurately positioned longitudinally of the machine at the notching and folding stations, in order that the can blanks be precisely notched and folded. This is accomplished in the present machine by over-feeding the can blanks by the fed bars 36 and 37 as they progress forwardly through the machine into approximate registration with the notching and folding mechanisms, and then returning them slightly by registration means, so that the can blanks are accurately registered with the notching and folding means previously described.

Figure 15:
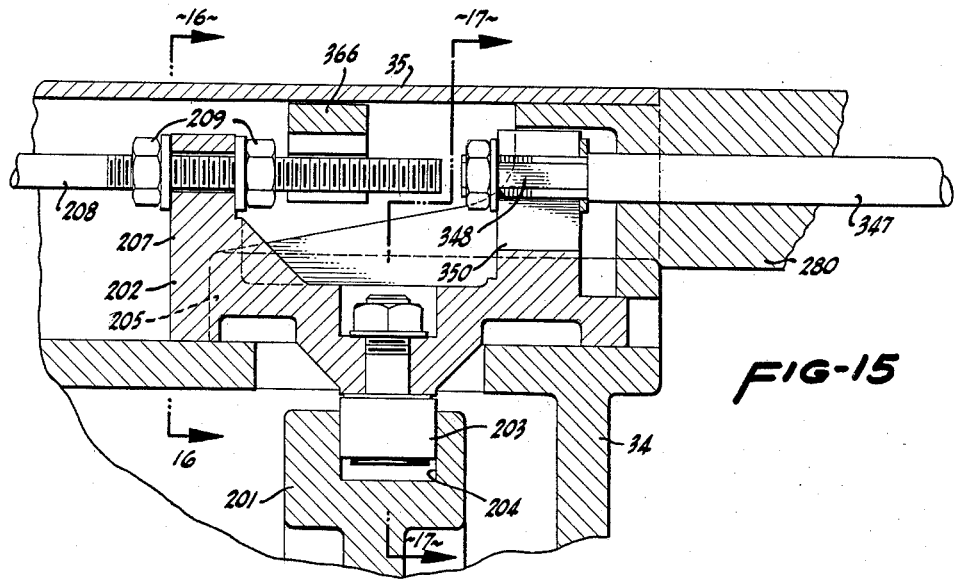
FIG. 15 is a longitudinal cross-sectional detail of the registration drive means, taken along line 15—15 of FIG. 14.
Figure 16:
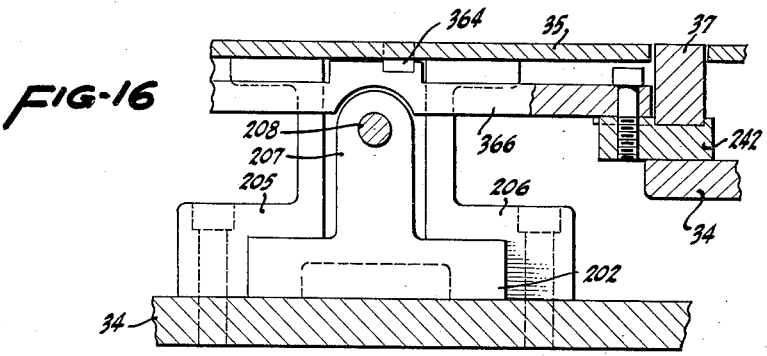
FIG. 16 is a transverse cross-sectional view taken on line 16—16 of FIG. 15.

Referring to FIGS. 15, 16 and 18, barrel cam 201 is mounted on main camshaft 55. Yoke 202 is positioned above the cam and is adapted to slide longitudinally of the frame of the machine under the influence of cam follower roller 203 mounted thereon and received within cam track 204 of cam 201. Vertical guide members 205 and 206 mounted on frame 34 prevent any transverse movement of yoke 202 with respect to frame 34.

The rear end of yoke 202 is provided with an upstanding flange 207 having a bore therethrough to receive the registration drive rod 208. Adjustment nuts 209 enable the position of rod 208 to be adjusted relative to yoke 202.

The registration drive rod 208 extends rearwardly of the machine to a position as shown in FIG. 18, wherein cross bar 211 is fixedly attached thereto and extends therefrom to the registration rods 212 and 213, one each adjacent and parallel to the fed bars 36 and 37, and is rigidly attached to these rods by conventional means, such as shown at 214, whereby reciprocation of the registration drive rod 208 will be transmitted into reciprocatory movement of the registration rods 212 and 213.

Registration rod 213 is journaled for reciprocatory movement in block members 215 clamped to frame 34, by means of plate 216 and bolts 217 and 218, as shown in FIG. 24, and has split sleeves 220 affixed thereto by bolts 221'.

Each sleeve 220 has an upstanding flange 221 having a pivot pin 222 engaging the rearward end of the registration levers 223. The rearward end of each registration lever 223 is provided with a downwardly depending finger 224 projecting into an annular groove 225 in collar member 226 freely slidable on rod 213. Spring 227 confined between sleeve 220 and collar 226 maintains the registration lever 223 in contact with pivot pin 222.

The forward end of registration lever 223 has a downwardly slanting cam surface 228 adapted to engage cam surface 229 on block member, whereby movement of rod 213 to the left, as viewed in FIG. 19, will cause the cam surfaces 228 and 229 to engage, thereby rocking lever 223 upwardly so that the upwardly projecting finger 230 on the registration lever 223 will rise through slot 231 in the frame surface 35 to engage a can blank 66 and will move the can blank rearwardly of the machine into registration with the notching and folding means previously described.

The barrel cam 201 which operates the registration means just described is adjusted on the main camshaft 55 so that the registration lever fingers 230 will move upwardly into engagement with the can blanks 66 immediately after the forward stroke of the feed bars 36 and 37 has been completed, and before the notching and folding mechanisms are actuated.

As has been explained, when the can body blanks leave the folding station 28, they pass through a fluxing station 29 wherein the folded side edges thereof are coated with flux.

The idle station 30 provides clearance between the fluxing station 29 and the forming station 31 so as to permit the can blanks to be shifted from the feed bars 36 and 37 to the outside fed bar extensions 236 and 237. This is necessary, for in the forming operation to be hereinafter described, the can blanks will be bent into cylinders, which necessitates that the can blanks be supported only at their centers, and at their side edges. The feed bars 36 and 37 are positioned inwardly of the side edges of, and underneath, the can blanks 66, in order not to interfere with the notching and folding means, and thus additional advancing means must be provided which will not underlie the can blanks when they are in the forming station 31.

Figure 17:
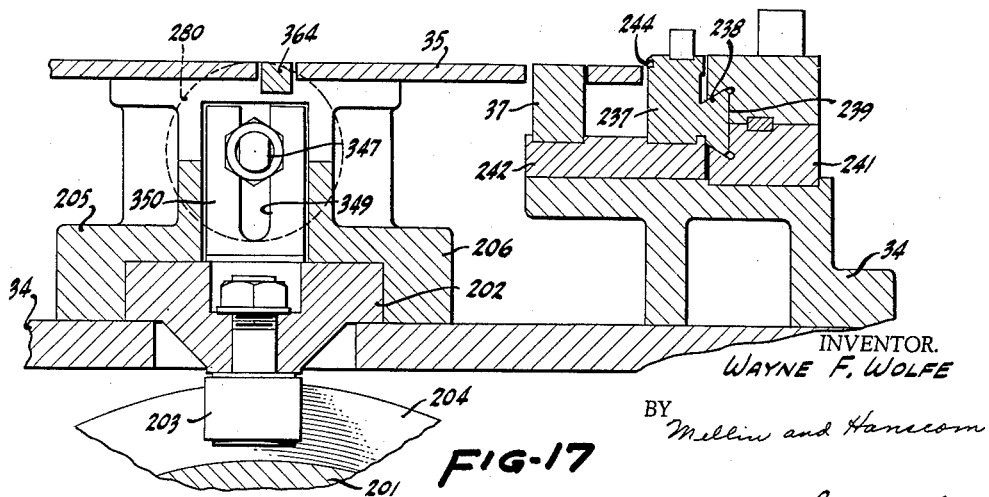
FIG. 17 is a transverse cross-sectional view taken on line 17—17 of FIG. 15.

Referring to FIGS. 1, 2 and 17, the feed bar extensions 236 and 237 are provided with outwardly extending dovetails 238 slidably mounted in dovetail grooves 239 formed on the inner surfaces of frame extension members 240 and 241, respectively, the frame extension members 240 and 241 being fixed to the frame 34 to extend forwardly therefrom. The extension feed bar 237 is connected by a cross-piece 242 to feed bar 37 so that the extension feed bar will reciprocate therewith, and a similar cross-piece 243 is utilized to transmit the reciprocatory motion of feed bar 36 to extension feed bar 236. As best seen in FIG. 17, each extension feed bar is provided with an inwardly facing longitudinal groove 244 adapted to slidably receive the folded side edges of the can blanks 66.

Figure 14:
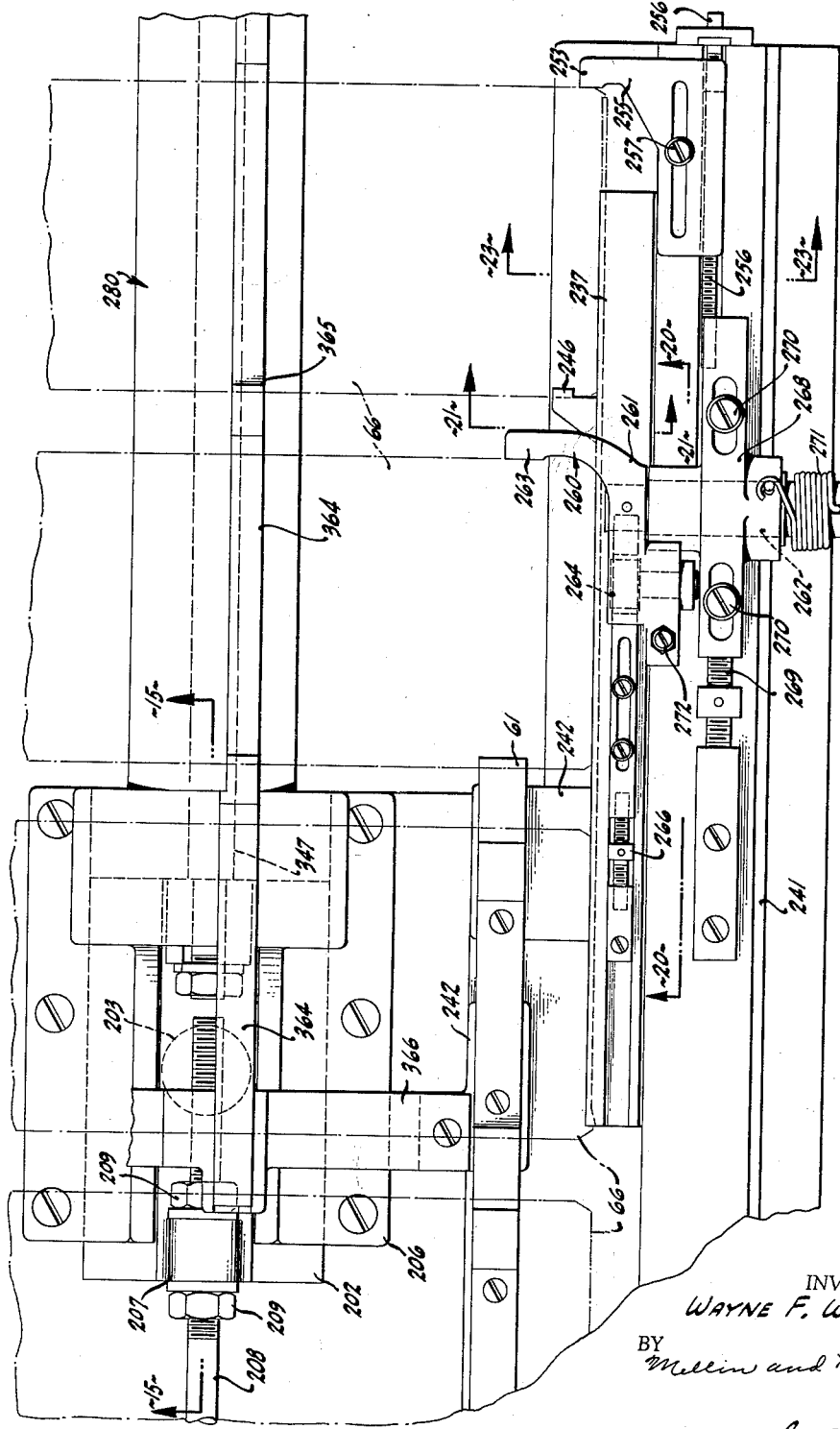
FIG. 14 is a partial plan view of the machine, illustrating the auxiliary feed bar mechanism.

As shown in FIG. 14, the can blanks 66 are moved into the $A_5$ and $B_5$ positions of the forming station 31 of the machine, the A blank by the forwardmost finger 61 on each feed bar 36 and 37, and the B blank by feed fingers 245 and 246 mounted on the extension feed bars 236 and 237, respectively. Since the mountings of these feed fingers are identical, only that pertaining to finger 246 will be described in detail. Referring to FIGS. 21 and 22, a recess 247 is formed in the inner surface of feed bar extension 237 to receive the finger mounting member 248. A pin 249 extends longitudinally of the mounting member and carries the finger 246 thereon, spring 250 being utilized to urge the finger forwardly on pin 249. Spring 251, confined between the finger 247 and the mounting member 248, urges the finger into the operative position shown in solid lines of FIG. 21. When in its operative position, the upwardly extending can engaging tip 252 will extend above the level of the can blanks 66 and forward movement of the feed bar extension 237 will cause the tip 252 to engage the can blanks 66 and move them forwardly against a fixed stop 253, the spring 250 allowing the finger to yieldably press the can blank against the stop member 253. On the return stroke of the feed bar extension, the cam surface 254 of finger 246 will engage the rearward can blank and force the finger to pivot to the dotted line position of FIG. 21 to enable the finger to ride under the rearward can blank.

The fixed stop member 253, illustrated in FIGS. 14 and 23, comprises an L-shaped bracket 255 mounted on adjusting screw 256, and clamped to frame extension 241 by bolt 257. The inwardly extending leg of the L-shaped bracket 255 has a downwardly depending portion 258 adapted to engage and limit the forward movement of a can body blank 66.

A movable stop member 260 is provided to arrest the forward motion of a can blank 66 moving into the $A_5$ position, while yet allowing the can blank moving into the $B_5$ position to pass thereby. Referring to FIGS. 14 and 20, the movable stop member 260 comprises a lever 261, fixed to shaft 262, and provided with a forward end 263 curving inwardly of the machine and extending downwardly in a can engaging surface 263. The rearward end of lever 261 carries a cam follower roller 264 adapted to engage a cam 265 fixed to the feed bar extension 237. Adjustment screw 266 enables the cam 265 to be adjusted longitudinally of the feed bar extension 237, with cap screws 267 being utilized to clamp cam 265 in its adjusted position.

Shaft 262 is journaled for rotation in bracket 268, the bracket being supported on frame extension 241 and being longitudinally adjustable relative thereto by adjustment screw 269, the bracket being clamped in its adjusted position by cap screws 270. Torsion spring 271 biases shaft 262 and lever 261 in a counterclockwise direction so that the can engaging surface 263 is pivoted out of can stopping position, the counterclockwise rotation being limited by the engagement of adjustment screw 272 with the frame extension 241.

In operation, the feed bar 37 and feed bar extension 237 will simultaneously move can blanks 66 into the $A_5$ and $B_5$ positions by the forwardmost feed finger 61 and feed finger 246, respectively. After the forwardmost of these can blanks has passed the movable stop member 260, cam 265 will engage cam follower roller 264, forcing lever 261 to pivot against the torsion spring 271 to move the can engaging lever surface 263 down into position to arrest the forward motion of the can blank moving into the $A_5$ position.

It will be understood that a similar fixed stop member 274, and a similar movable stop member 275, corresponding to elements 253 and 260, respectively, are provided on the other side of the machine.

Figure 28:
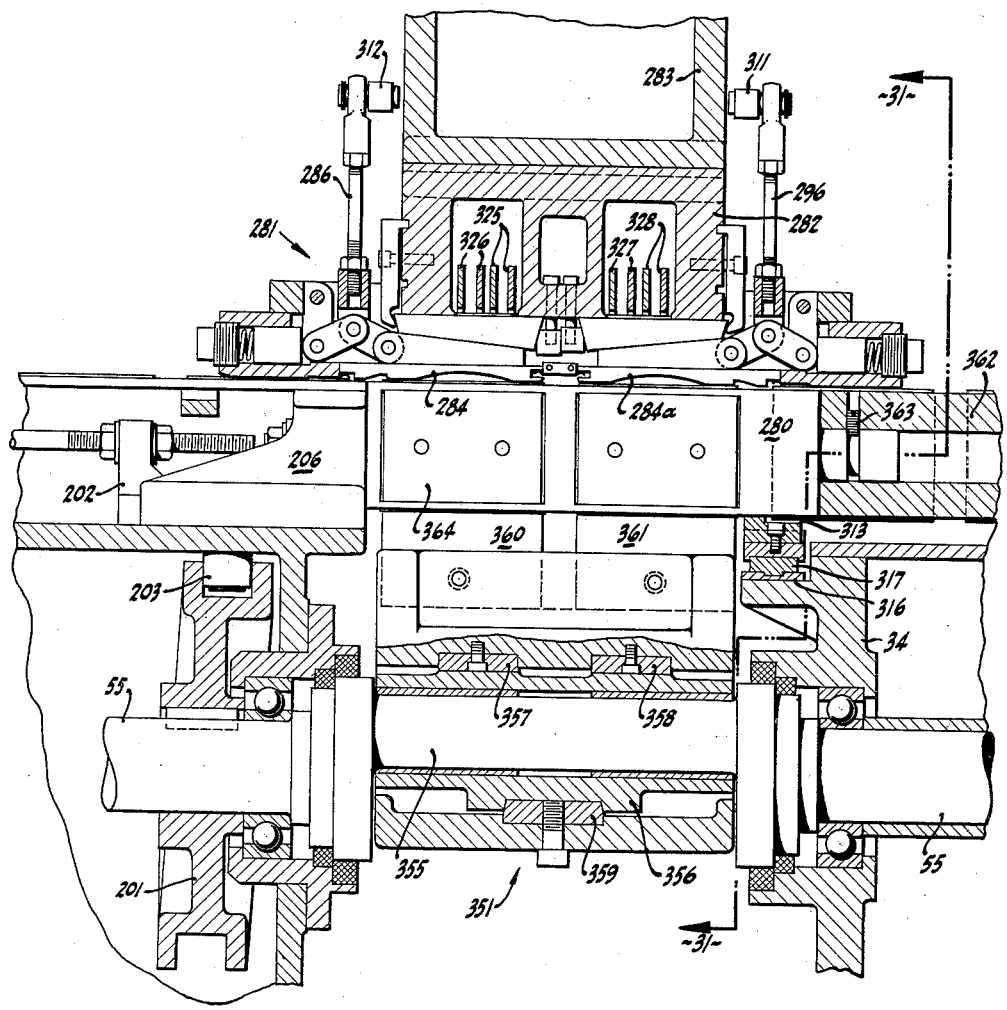
FIG. 28 is a longitudinal cross-sectional view of the forming station, taken along line 28—28 of FIG. 27.

Referring now to FIG. 28, a conventional cylindrical forming horn 280 is mounted on the front end of the upright guide members 205 and 206, and, consequently, to frame 34, and extends forwardly from the machine frame with the uppermost surface of the horn being coplanar with the upper surface 35 of the machine. As the can blanks 66 are arrested at the positions $A_5$ and $B_5$ by the stops 253, 260, 274 and 275 described above, they are clamped to the upper surface of the forming horn by a clamping mechanism generally indicated at 281 and illustrated in FIGS. 28–31.

The clamping mechanism 281 comprises a vertically extending member 282 bolted to an upper frame member 283 so as to be positioned centrally and above the forming horn 280. The upper frame member 283 is either formed integrally with or fixed to the main frame 34. Two clamping shoes 284 and 284a are carried on the lower end of frame member 282, and extend longitudinally above the forming horn 280 so that the shoes may be moved downwardly against the bias of their supporting leaf springs 285 into engagement with the can blanks 66.

A rod 286 is disposed for reciprocatory vertical movement to actuate toggle mechanism 287 and, in turn, move the clamping shoe 284 into and out of engagement with the can blanks 66. As rod 286 is moved downwardly, it will force link 288 and cam 289 to the right, to the position as shown in FIG. 29. The movement of cam 289 to the right against cam 290 secured to frame member 282 will cause a downward force to be applied to shoe 284, causing it to clamp the can blank 66 against the forming horn 280. Further downward movement of rod 286 will be taken up by forcing link 291 to the left against the spring biased piston 292. As the rod 286 is moved upwardly, the link 291 will return to its original position under the force of the piston 292, the link 291 being limited in its rightward movement by the engagement of lever 293 with the top of the piston housing 294, and the continuation of upward movement of rod 286 will then cause the retraction of cam 289 to the left so that the leaf springs 295 may urge the clamping shoe 284 upwardly out of clamping engagement with the can blank 66. The other clamping shoe 284a is operated in response to vertical movement of rod 296 in the same manner.

Cam 290, secured to frame member 282, is capable of being adjusted in the following manner: A cam block 297 is arranged to move vertically on frame member 282 by means of cap screw 298, and has a cam face 299 in engagement with a complementary cam face 300 on cam member 290. As viewed in FIG. 29, if cam block 297 is moved upwardly, cam member 290 will be caused to move to the left. The left end of cam member 290 is secured to frame member 282 by bracket 301 and bolt 302, as shown. The other cam member 303 is similarly adjustable relative to frame member 282.

Figure 31:
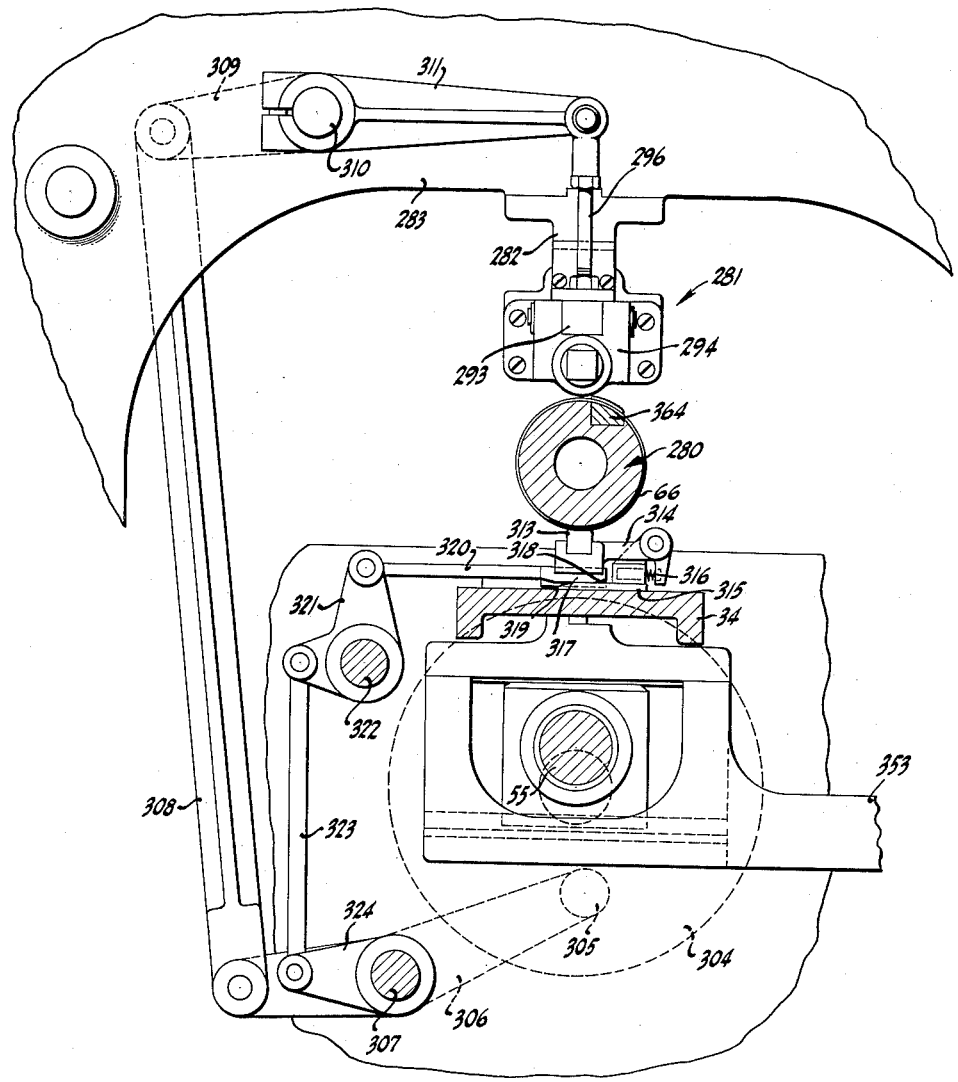
FIG. 31 is a transverse cross-sectional view illustrating the horn support, and taken on line 31—31 of FIG. 28.

Referring to FIG. 31, a face cam 304 is secured to main camshaft 55, with cam follower roller 305 received within the cam track thereof. As the roller 305 follows the cam track, lever arm 306 will rock around stub shaft 307 fixed to frame 34, causing shaft 308 to vertically reciprocate. This motion is transmitted to crank 309 to cause it to rock stub shaft 310 journaled to the upper frame member 283. Crank arm 311 is fixed to shaft 310 and rocks therewith to vertically reciprocate the clamping shoe actuating rod 296. A second crank 312 is also fixed to shaft 310 to vertically reciprocate the clamping shoe actuating rod 286.

In order to counteract the downward thrust of the clamping mechanism 281 on the forming horn 280, a support 313 is provided between the can blank position $B_5$ and $A_6$ to contact the lower surface of the forming horn 280. The support 313 is adapted to support the forming horn only when the clamping mechanism 281 is in operative clamping position, since the support 313 must be out of the way when the formed can blanks 66 are removed from the forming horn 280. Support 313 is mounted on a lever 314 which is pivotally mounted intermediate its ends to bracket 315 and is normally biased out of horn 280 supporting engagement by means of spring 316. Suitable means (not shown) secure bracket 315 to frame 34. Cam 317, slidably mounted transversely of the machine in itable slots in lever 314 and bracket 315, causes the support 313 to be forced upwardly by the engagement of cam surface 318 on cam 317 and cam surface 319 on bracket 315 as cam 317 is moved to the right. Leftward movement of cam 317 will allow spring 316 to return the support 313 to its "at rest" position.

Cam 317 is secured to one end of rod 320, which, in turn, is connected to one arm of bell crank 321, rotatably mounted on frame 34 by shaft 322, the bell crank 321 being rocked by rod 323 attached thereto and to crank 324, which rocks in unison with lever 306.

Referring now to FIGS. 27 and 28, the machine is provided with two pairs of forming wings 325, 326 and 327, 328, respectively, to form the can blanks 66 into cylindrical cans after they have been clamped to the surface of the forming horn 280 as described above. The forming wings 325 and 327 are pivotally mounted on shaft 329, and the forming wings 326 and 328 are pivotally mounted on shaft 330, both shafts being journaled in the upper frame member 282. Each of the forming wings 325 to 328, inclusive, is provided with an arcuate inner face adapted to strip the clamped can blanks 66 from the grooves 244 in the extension feed bars 236 and 237, and wrap the can blanks 66 around the cylindrical forming horn 280. When the can blanks are so wrapped around the forming horn, the oppositely folded side edges of the can blanks 66 will be interengaged.

As both of the operating mechanisms for actuating the oppositely disposed forming wings are identical, only the mechanism associated with forming wing 326 will be described in detail. Face cam 331 is fixed to the main camshaft 55 and is provided with a cam track receiving cam follower roller 332 mounted on one end of crank 333 fixed at the other end thereof to shaft 334 journalled for rotation in frame 34. The camming motion of the above elements will act to oscillate crank 336, also fixed to shaft 334, and thus will vertically reciprocate piston rod 337 which is pivotally connected thereto. Downward movement of piston rod 337 will be transmitted through spring 338 to piston housing 339 pivotally connected at its upper end to lever arm 340, to rotate that member downwardly above pivot 341 mounted on the upper frame member 283.

This latter motion will be transmitted through link 342 to forming wing 326, causing it to move downwardly about its pivot point 330 into forming relation with forming horn 280. Spring 338 will enable the piston 337 to overtravel to insure a firm engagement of forming wing 326 with the forming horn 280. The forming wing 325 is operated simultaneously into forming engagement with the forming horn 280 in the same manner, with cam follower roller 332′ being received within a cam track on face cam 331′ mounted adjacent to face came 331 on main camshaft 55.

After the can blanks 66 have been wrapped around the forming horn 280 and the oppositely hooked ends thereof have been overlapped by the action of the forming wings described above, a conventional expander mechanism incorporated in the forming horn 280 is actuated to expand the formed can blank so as to hook the overlapped side edges thereof tightly together. The expander mechanism comprises two expander cheeks 345 and 346 mounted for lateral sliding movement relative to the forming horn 280. The expander cheeks are caused to move outwardly from the center of the forming horn in a conventional manner by means of cams (not shown) mounted on an expander shaft 347 extending axially through the forming horn 280. The expander shaft extends rearwardly of the forming horn 280 and is attached to the same carriage 202 that operates the registration mechanism at the notching and folding stations as described above. Thus the expander shaft is longitudinally reciprocated in timed relationship to the rotation of the main camshaft 55. The expander shaft 347 is provided with flat side surfaces 348 received within a vertical slot 349 in the forward upstanding flange 350 of carriage 202, so that the expander shaft will be prevented from rotation as it reciprocates. The vertical slot 349 in carriage 202 enables different diameter forming horns 280 to be utilized in the machine, if it is desired to use the machine for making different size can bodies.

After the expander mechanism has tightly interengaged the hooked edges of the can blanks 66, a bumper mechanism indicated generally at 351 moves upwardly against the hooked edges to firmly clench the edges in their interengaged relationship. The bumper mechanism 351 comprises a main rectangular frame 352 having a transversely extending and upwardly curving arm 353 pivotally mounted at 354 to the upper frame member 283. The frame 351 is moved vertically by a scotch yoke assembly comprising an eccentric journal 355 in the main camshaft 55. A rectangular slide member 356 embraces the journal 355 so as to allow relative rotation therebetween, and is mounted for sliding movement transversely of the machine in frame 352 by means of guide rails 357, 358 and 359. Two bumper bars 360 and 361 are fastened to the upper portion of frame 356, so that they will strike the interengaged edges of the can blanks at the $A_5$ and $B_5$ positions to tightly clench the ends together.

After the can blanks 66 have been formed, expanded and bumped, as above described, they are moved off the forming horn 280 onto a horn extension 362, secured thereto by set screw 363, by means of an extractor bar 364, shown in FIGS. 1, 2, 16 and 27. The extractor bar 364 slides longitudinally of the machine in a complementary groove formed in the upper portion of the forming horn 280 and horn extension 362, and carries a plurality of upwardly extending spring fingers 365 adapted to engage the rear edges of the formed can blanks 66 and to move them forwardly as the extractor bar so moves. The fingers 365 have not been illustrated in detail, but correspond in appearance and operation to the feed fingers 61 on the feed bars 36 and 37 of the machine. The extractor bar extends rearwardly of the forming horn 280 and is connected to a cross-piece 366, in turn connected to the forward ends of feed bars 36 and 37 so as to reciprocate therewith.

Referring again to FIG. 2, a pair of pick-up endless chain conveyors 374 and 375 is mounted adjacent the horn extension 362 with reaches 374a and 375a extending parallel to each other and to the longitudinal axis of said forming horn extension 362 and lying closely adjacent to the surface of said forming horn extension, the chains 374 and 375 each trained over a drive sprocket fixed to drive shaft 376 and continuously driven by conventional means (not shown), such as an electric motor. The rearmost end of chain 374 is trained around an idler sprocket 377 adjacent the rear of the can blank position $A_7$, and the rearmost end of chain 375 is trained around a similar idler sprocket 378 adjacent the rear of can blank position $B_6$. Chains 374 and 375 are each provided with spaced fingers 379 and 380, respectively, adapted to engage the rear edges of the formed cans and to slide them longitudinally along the mandrel extension 362. Both chains are driven so as to travel at the same linear speed as the extractor bar 364, but the fingers 379 on chain 374 are so positioned relative to fingers 380 on chain 375 that the fingers 379 will pick up and start moving the can from position $A_7$ slightly prior to the moving of cans from position $B_6$ by fingers 380, to thus increase the spacing between the cans.

The extractor bar 364, in the operation of the machine, will move the formed cans from the positions $A_5$ and $B_5$ to the $A_6$ and $B_6$ positions, respectively, and the chain conveyor 375 will pick up the can at position $B_6$ and move it forwardly. The next extractor bar stroke will move the can from position $A_6$ to $A_7$ so that the chain conveyor 374 may pick it up and move it forwardly. In running operation of the machine, it will be realized that for each forward stroke of the extractor bar 362 that the cans at positions $B_5$ and $A_6$ will be moved simultaneously into the positions $B_6$ and $A_7$, respectively, so that two cans are delivered to the chain conveyors 374 and 375 at each cycle of operation of the machine. As has been stated, the chain 374 will then move the can from position $A_7$ before the chain 375 moves the can from position $B_6$. This delay increases the spacing between the $B_6$ and $A_7$ positions to an amount approximately equal to the spacing between the can in position $B_7$ and the can in position $A_7$. Thus, even though pairs of cans are fed intermittently to the chain conveyors 374 and 375, the cans are conveyed thereby in a steady stream at equally spaced intervals.

A third endless conveyor, shown in part at 390, and having can engaging fingers 391 mounted thereon, is located with a reach 390a thereof parallel to, closely, and adjacent the surface of the outer end of the horn extension 362. As shown, the rearmost end of the reach 390a is intermediate the ends of the conveyors 374 and 375. The fingers 391 are so positioned on chain 390, and the chain 390 is operated in timed relation to chains 374 and 375, that one of the fingers will enter between the can blanks when they reach the positions $A_7$ and $B_7$ and will pick up the cans as they reach the $B_7$ position can blank and carry them to and through a soldering station (not shown), between two semi-circular guide rails 392 and 393. The conveyor 390 is operated at a higher linear speed than the conveyors 354 and 355 so that the fingers 391 will move more rapidly away from the forming machine than will the can bodies on conveyors 354 and 355 and thus will insure that the can bodies are picked up by the fingers 391.

The operation of the machine has been largely described in the above description, and need not be repeated in full detail. It should be noted that on the first portion of the cycle of rotation of the main camshaft 55, that all of the can blanks 66 are advanced forwardly two can blank positions in the machine, and the various face cams, and barrel cams on the camshaft are so synchronized with the feed bar barrel cam that two can blanks are fed to the machine, two can blanks are notched, two can blanks are folded, two can blanks are fluxed, two can blanks are formed into cylindrical cans, and two formed cans are removed from the machine, all during the last portion of the cycle of rotation of the main camshaft.

It is to be understood that the form of the invention, herewith shown and described, is to be taken as a preferred embodiment of the same, and that various changes in the shape, size and arrangement of parts may be resorted to, without departing from the spirit of my invention, or the scope of the attached claims.

Having thus described my invention, what I claim and desire to secure by Letters Patent is:

1. In a can body making machine; a frame having a flat upper surface; a reciprocating feed mechanism for moving spaced can body blanks longitudinally along said flat upper surface from the rear end toward the front end thereof; a cylindrical forming horn connected to the front end of said frame and extending forwardly therefrom; a pair of frame extensions extending parallel to the axis of said forming horn adjacent the upper surface thereof; a first pair of stop members fixed one to each of said frame extension members and extending inwardly thereof, the forward edge of the forwardmost body blank being adapted to strike said stop members and be arrested thereby on a forward stroke of said feed mechanism; a second pair of stop members one pivotally mounted on each said frame extension members, said second stop members being spring biased to a position out of line with the line of movement by said feed mechanism of said body blanks; and cam means on said feed mechanism for moving said second stop members into said line of movement after the forwardmost blank has moved therepast whereby said second stop members will be struck by the forward edge of the next adjacent blank to arrest the forward movement thereof.

2. In a can body making machine, a frame having a flat upper surface; a reciprocating feed mechanism for moving spaced can body blanks longitudinally along said flat upper surface from the rear end toward the front end thereof, said feed mechanism being adapted to move said body blanks intermittently forwardly a distance twice the width of one blank plus twice the distance between blanks on each stroke; a cylindrical forming horn connected to the front end of said frame and extending forwardly therefrom, the uppermost surface of said horn being coplanar with said horizontal surface; a pair of frame extensions extending parallel to the axis of said forming horn adjacent the upper surface thereof; a first pair of stop members fixed one to each of said frame extension members and extending inwardly thereof, the forward edge of the forwardmost body blank being adapted to strike said stop members and be arrested thereby on a forward stroke of said feed mechanism; a second pair of stop members, one pivotally mounted on each said frame extension members, said second stop members being spring biased to a position out of line with the line of movement by said feed mechanism of said body blanks; and cam means on said feed mechanism for moving said second stop members into said line of movement after the forwardmost blank has moved therepast whereby said second stop members will be strucky by the forward edge of the next adjacent blank to arrest the forward movement thereof.

3. In a can body making machine, a frame having a flat upper surface; a reciprocating feed mechanism for moving spaced can body blanks longitudinally along said flat upper surface from the rear end toward the front end thereof, said feed mechanism being adapted to move said body blanks intermittently forwardly a distance twice the width of one blank plus twice the distance between blanks on each stroke; a cylindrical forming horn connected to the front end of said frame and extending forwardly therefrom, the uppermost surface of said horn being coplanar with said horizontal surface; a pair of frame extensions extending parallel to the axis of said forming horn adjacent the upper surface thereof; a first pair of stop members fixed one to each of said frame extension members and extending inwardly thereof, the forward edge of the forwardmost body blank being adapted to strike said stop members and be arrested thereby on a forward stroke of said feed mechanism; a second pair of stop members one pivotally mounted on each said frame extension members, said second stop members being spring biased to a position out of line with the line of movement by said feed mechanism of said body blanks; cam means on said feed mechanism for moving said second stop members into said line of movement after the forwardmost blank has moved therepast whereby said second stop members will be struck by the forward edge of the next adjacent blank to arrest the forward movement thereof; and a clamping means for clamping said forwardmost and next adjacent blanks to the uppermost surface of said forming horn in the positions determined by said first and second pairs of stops.

4. In a can body making machine, a frame having a flat upper surface, a feed mechanism for moving spaced can body blanks longitudinally along said flat upper surface from the rear end toward the front end thereof, said feed mechanism being adapted to move said body blanks intermittently forwardly a distance twice the width of one blank plus twice the distance between blanks on each stroke; means adjacent the side edges of said horizontal surface for simultaneously notching the four corners of two adjacent blanks between forward strokes of said feed mechanism; means forward of said notching means for simultaneously oppositely folding the side edges of two adjacent notches blanks, the reverse fold on one edge thereof being upwardly directed and the fold on the other edge thereof being downwardly directed; a cylindrical forming horn connected to the front end of said frame and extending forwardly therefrom, the uppermost surface of said horn being coplanar with said horizontal surface; a pair of frame extensions extending parallel to the axis of said forming horn adjacent the upper surface thereof; a first pair of stop members fixed one to each of said frame extension members and extending inwardly thereof, the forward edge of the forwardmost body blank being adapted to strike said stop members and be arrested thereby on each forward stroke of said feed mechanism; a second pair of stop members one pivotally mounted on each of said frame extension members, said second stop members being spring biased to a position out of line with the line of movement of said body blanks; and cam means on said feed mechanism for moving said second stop members into said line of movement after the forwardmost blank has moved therepast whereby said second stop members will be struck by the forward edge of the next adjacent blank to arrest the forward movement thereof.

5. In a can body making machine, a frame having a flat upper surface; a feed mechanism for moving spaced can body blanks longitudinally along said flat upper surface from the rear end toward the front end thereof, said feed mechanism being adapted to move said body blanks intermittently forwardly a distance twice the width of one blank plus twice the distance between blanks on each stroke; means adjacent the side edges of said horizontal surface for simultaneously notching the four corners of two adjacent blanks between forward strokes of said feed mechanism; means forward of said notching means for simultaneously oppositely folding the side edges of two adjacent notched blanks, the reverse fold on one edge thereof being upwardly directed and the fold on the other edge thereof being downwardly directed; a cylindrical forming horn connected to the front end of said frame and extending forwardly therefrom, the uppermost surface of said horn being coplanar with said horizontal surface; a pair of frame extensions extending parallel to the axis of said forming horn adjacent the upper surface thereof; a first pair of stop members fixed one to each of said frame extension members and extending inwardly thereof, the forward edge of the forwardmost body blank being adapted to strike said stop members and be arrested thereby on each forward stroke of said feed mechanism; a second pair of stop members one pivotally mounted on each of said frame extension members, said second stop members being spring biased to a position out of line with the line of movement of said body blanks; cam means on said feed mechanism for moving said second stop members into said line of movement after the forwardmost blank has moved therepast whereby said second stop members will be struck by the forward edge of the next adjacent blank to arrest the forward movement thereof; means including a cam follower for actuating each one of said feed mechanism, notching means and folding means; a continuously rotatable camshaft; and a plurality of cams on said camshaft, each one of said cams being in operative engagement with one of said cam followers, whereby the various means operated thereby will be actuated in timed relationship to the rotation of said camshaft.

6. In a can body making machine, a frame having a flat upper surface; a feed mechanism for moving spaced can body blanks longitudinally along said flat upper surface from the rear end toward the front end thereof, said feed mechanism being adapted to move said body blanks intermittently forwardly a distance twice the width of one blank plus twice the distance between blanks on each stroke; means adjacent the side edges of said horizontal surface for simultaneously notching the four corners of two adjacent blanks between forward strokes of said feed mechanism; means forward of said notching means for simultaneously oppositely folding the side edges of two adjacent notched blanks, the reverse fold on one edge thereof being upwardly directed and the fold on the other edge thereof being downwardly directed; a cylindrical forming horn connected to the front end of said frame and extending forwardly therefrom, the uppermost surface of said horn being coplanar with said horizontal surface; a pair of frame extensions extending parallel to the axis of said forming horn adjacent the upper surface thereof; a first pair of stop members fixed one to each of said frame extension members and extending inwardly thereof, the forward edge of the forwardmost body blank being adapted to strike said stop members and be arrested thereby on each forward stroke of said feed mechanism; a second pair of stop members one pivotally mounted on each of said frame extension members, said second stop members being spring biased to a position out of line with the line of movement of said body blanks; cam means on said feed mechanism for moving said second stop members into said line of movement after the forwardmost blank has moved therepast whereby said second stop members will be struck by the forward edge of the next adjacent blank to arrest the forward movement thereof; an upper frame extension connected to said frame and extending over said forming horn; a clamping mechanism for clamping said forwardmost and next adjacent blanks to the uppermost surface of said forming horn in the positions determined by said first and second pairs of stops; two pairs of forming wings pivotally mounted to said upper frame extension, each of said pairs of wings being adapted to wrap one of said blanks around said horn to form a can body and bring the hook shaped edges thereof into overlapping relation; means in said horn to expand said can body and tightly interengage said hooked ends; means adapted to strike said interengaged ends and clench said ends in their interengaged relation; and extractor means slidably mounted in said horn and connected to said feed mechanism for movement therewith for removing said can bodies forwardly from the forming zone.

7. In a can body making machine; a frame having stations thereon for notching and folding side edges of pairs of can body blanks; a reciprocating feed bar means for moving said pairs of can body blanks intermittently forwardly through said stations, said feed bar means operating to move said blanks forwardly a distance twice the width of one blank plus the spacing between blanks on each forward stroke thereof; a forming horn mounted on said frame and extending forwardly from said stations in line therewith; a pair of auxiliary feed bars connected to said feed bar means for movement therewith and disposed parallel to the axis of said forming horn, means on said auxiliary feed bars for gripping the side edges of said can body blanks; a first pair of stop members disposed in fixed relation to said forming horn and in position to engage the forward edge of and arrest forward movement of the forwardmost can body blank upon a forward stroke of said auxiliary feed bars; a second pair of stop members disposed adjacent said auxiliary feed bars and disposable in the path of movement of said can blanks as they are moved forwardly by said auxiliary feed bars, means for removing said second pair of stop members from said path during the portion of the forward stroke of said auxiliary feed bars when the forwardmost can blank is moved past said second pair of stop members, and cam means on said auxiliary feed bars for moving said second stop members into the path of can blank movement after the movement of said forwardmost can body blank therepast to engage the forward edge of the next forwardmost can body blank and arrest the forward movement thereof.

8. An automatic can body making machine including a longitudinally extending work surface; means for intermittently feeding can body blanks onto said work surface and operable in a cycle; means in operative association with said work surface and operable in said cycle for notching the side edges of said can blanks; means in operative association with said work surface and operable in said cycle for oppositely folding the side edges of said can blanks; feed means operable in said cycle for moving can blanks longitudinally and step by step forwardly along said work surface from said feeding means into approximate registration with and slightly beyond said notching means and folding means; and registration means operable in synchronism with said feeding means for moving said can blanks backwardly into exact registration with said notching and folding means after movement of said can blanks forwardly by said feeding means and before operation of said notching and folding means, each registration means comprising: a reciprocated registration rod underlying said work surface, a registration lever pivotally mounted to said rod, said lever having a cam surface thereon and an upwardly projecting finger, means defining a positioned cam surface disposed in the path of lever movement and engageable with said cam surface of said lever; and means biasing said lever toward a cam surface engaging position; whereby upon reciprocation of said rod said lever cam surface engages said positioned cam surface, pivoting said lever finger upward through said work surface for engaging the forward end of a can blank and moving said can blank backwardly into a position of exact registration.

References Cited in the file of this patent
UNITED STATES PATENTS

| | | |
|---|---|---|
| 310,895 | Jordan | Jan. 20, 1885 |
| 704,700 | Hodgson | July 15, 1902 |
| 950,742 | Black | Mar. 1, 1910 |
| 1,020,560 | Krohn | Mar. 19, 1912 |
| 1,582,093 | Stuart | Apr. 27, 1926 |
| 1,798,439 | Seaholm | Mar. 31, 1931 |
| 1,917,359 | Cameron | July 11, 1933 |
| 2,142,235 | Burns | Jan. 3, 1939 |
| 2,203,403 | Cameron | June 4, 1940 |
| 2,458,008 | Kruse | Jan. 4, 1949 |